United States Patent
Enete et al.

(10) Patent No.: US 8,078,678 B2
(45) Date of Patent: Dec. 13, 2011

(54) VIDEO MESSAGING

(75) Inventors: Noel Enete, Seal Beach, CA (US); Wayne Packard, Rancho Santa Margarita, CA (US); Harry W. Morris, Reston, VA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 13/118,187

(22) Filed: May 27, 2011

(65) Prior Publication Data

US 2011/0231506 A1 Sep. 22, 2011

Related U.S. Application Data

(63) Continuation of application No. 09/911,799, filed on Jul. 25, 2001, now Pat. No. 7,984,098.

(60) Provisional application No. 60/220,648, filed on Jul. 25, 2000.

(51) Int. Cl.
*G06F 15/16* (2006.01)

(52) U.S. Cl. ........ 709/204; 709/205; 709/206; 709/207; 709/227

(58) Field of Classification Search .......... 709/200–207, 709/217–227
See application file for complete search history.

(56) References Cited

U.S. PATENT DOCUMENTS

| | | | |
|---|---|---|---|
| 4,837,798 A | 6/1989 | Cohen et al. | |
| 5,086,394 A | 2/1992 | Shapira | |
| 5,276,905 A | 1/1994 | Hurst et al. | |
| 5,327,486 A | 7/1994 | Wolff et al. | |
| 5,533,110 A | 7/1996 | Pinard et al. | |
| 5,548,637 A | 8/1996 | Heller et al. | |
| 5,557,659 A | 9/1996 | Hyde-Thomson | |
| 5,583,920 A | 12/1996 | Wheeler, Jr. | |
| 5,608,786 A | 3/1997 | Gordon | |
| 5,610,910 A | 3/1997 | Focsaneanu et al. | |
| 5,650,994 A | 7/1997 | Daley | |
| 5,694,616 A | 12/1997 | Johnson et al. | |
| 5,721,906 A | 2/1998 | Siefert | |
| 5,742,905 A | 4/1998 | Pepe et al. | |
| 5,764,916 A | 6/1998 | Busey et al. | |
| 5,774,670 A | 6/1998 | Montulli | |
| 5,790,800 A | 8/1998 | Gauvin et al. | |
| 5,793,365 A | 8/1998 | Tang et al. | |
| 5,802,470 A | 9/1998 | Gaulke et al. | |
| 5,835,724 A | 11/1998 | Smith | |
| 5,848,134 A | 12/1998 | Sekiguchi et al. | |

(Continued)

FOREIGN PATENT DOCUMENTS

EP 0862304 9/1998

(Continued)

OTHER PUBLICATIONS

"A Countermeasure to Duplicate-detecting Anti-spam Techniques," Robert J. Hall, AT&T Labs Technical Report 99.9.1, 1999, Abst. and pp. 1-26.

(Continued)

*Primary Examiner* — Moustafa M Meky

(74) *Attorney, Agent, or Firm* — Finnegan, Henderson, Farabow, Garrett & Dunner, LLP

(57) ABSTRACT

Systems and techniques for transferring electronic data between users of a communications system by receiving, at an instant messaging host, a video file from a sender and intended for a recipient; authenticating the video file; and sending the video file to the intended recipient.

20 Claims, 14 Drawing Sheets

U.S. PATENT DOCUMENTS

| | | |
|---|---|---|
| 5,850,594 A | 12/1998 | Cannon et al. |
| 5,859,979 A | 1/1999 | Tung et al. |
| 5,867,162 A | 2/1999 | O'Leary et al. |
| 5,870,744 A | 2/1999 | Sprague |
| 5,872,521 A | 2/1999 | Lopatukin et al. |
| 5,878,219 A | 3/1999 | Vance, Jr. et al. |
| 5,893,091 A | 4/1999 | Hunt et al. |
| 5,893,099 A | 4/1999 | Schreiber et al. |
| 5,919,247 A | 7/1999 | Van Hoff et al. |
| 5,920,692 A | 7/1999 | Nguyen et al. |
| 5,940,488 A | 8/1999 | DeGrazia et al. |
| 5,946,617 A | 8/1999 | Portaro et al. |
| 5,948,058 A | 9/1999 | Kudoh et al. |
| 5,951,643 A | 9/1999 | Shelton et al. |
| 5,951,646 A | 9/1999 | Brandon |
| 5,951,652 A | 9/1999 | Ingrassin, Jr. et al. |
| 5,954,798 A | 9/1999 | Shelton et al. |
| 5,956,716 A | 9/1999 | Kenner et al. |
| 5,960,173 A | 9/1999 | Tang et al. |
| 5,983,369 A | 11/1999 | Bakoglu et al. |
| 5,987,113 A | 11/1999 | James |
| 5,987,407 A | 11/1999 | Wu et al. |
| 5,991,791 A | 11/1999 | Siefert |
| 5,995,023 A | 11/1999 | Kreft |
| 6,002,402 A | 12/1999 | Schacher |
| 6,006,179 A | 12/1999 | Wu et al. |
| 6,009,413 A | 12/1999 | Webber et al. |
| 6,012,051 A | 1/2000 | Sammon, Jr. et al. |
| 6,014,135 A | 1/2000 | Fernandes |
| 6,014,638 A | 1/2000 | Burge et al. |
| 6,026,403 A | 2/2000 | Siefert |
| 6,026,429 A | 2/2000 | Jones et al. |
| 6,049,533 A | 4/2000 | Norman et al. |
| 6,065,047 A | 5/2000 | Carpenter et al. |
| 6,070,171 A | 5/2000 | Snyder et al. |
| 6,073,138 A | 6/2000 | De l'Etraz et al. |
| 6,081,830 A | 6/2000 | Schindler |
| 6,085,223 A | 7/2000 | Carino, Jr. et al. |
| 6,088,435 A | 7/2000 | Barber et al. |
| 6,134,432 A | 10/2000 | Holmes et al. |
| 6,144,991 A | 11/2000 | England |
| 6,151,584 A | 11/2000 | Papierniak et al. |
| 6,161,130 A | 12/2000 | Horvitz et al. |
| 6,166,730 A | 12/2000 | Goode et al. |
| 6,175,831 B1 | 1/2001 | Weinreich et al. |
| 6,192,395 B1 | 2/2001 | Lerner et al. |
| 6,195,354 B1 | 2/2001 | Skalecki et al. |
| 6,199,103 B1 | 3/2001 | Sakaguchi et al. |
| 6,212,548 B1 | 4/2001 | DeSimone et al. |
| 6,212,550 B1 | 4/2001 | Segur |
| 6,223,213 B1 | 4/2001 | Cleron et al. |
| 6,233,577 B1 | 5/2001 | Ramasubramani et al. |
| 6,249,740 B1 | 6/2001 | Ito et al. |
| 6,259,891 B1 * | 7/2001 | Allen ............................ 455/3.02 |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,311,211 B1 | 10/2001 | Shaw |
| 6,314,450 B1 | 11/2001 | Hachiya et al. |
| 6,317,776 B1 | 11/2001 | Broussard et al. |
| 6,324,541 B1 | 11/2001 | De l'Etraz et al. |
| 6,330,590 B1 | 12/2001 | Cotton |
| 6,347,332 B1 | 2/2002 | Malet et al. |
| 6,351,698 B1 | 2/2002 | Kubota et al. |
| 6,363,392 B1 | 3/2002 | Halstead et al. |
| 6,374,246 B1 | 4/2002 | Matsuo |
| 6,374,290 B1 | 4/2002 | Scharber et al. |
| 6,389,127 B1 | 5/2002 | Vardi et al. |
| 6,389,372 B1 | 5/2002 | Glance et al. |
| 6,393,464 B1 | 5/2002 | Dieterman |
| 6,400,381 B1 | 6/2002 | Barrett et al. |
| 6,405,035 B1 | 6/2002 | Singh |
| 6,405,249 B1 | 6/2002 | Matsuda et al. |
| 6,415,318 B1 | 7/2002 | Aggarwal et al. |
| 6,421,439 B1 | 7/2002 | Liffick |
| 6,421,709 B1 | 7/2002 | McCormick et al. |
| 6,425,012 B1 | 7/2002 | Trovato et al. |
| 6,430,344 B1 | 8/2002 | Dixon et al. |
| 6,430,604 B1 | 8/2002 | Ogle et al. |
| 6,446,112 B1 | 9/2002 | Bunney et al. |
| 6,449,344 B1 | 9/2002 | Goldfinger et al. |
| 6,449,634 B1 | 9/2002 | Capiel |
| 6,480,885 B1 | 11/2002 | Olivier |
| 6,484,196 B1 | 11/2002 | Maurille |
| 6,501,834 B1 | 12/2002 | Milewski et al. |
| 6,507,866 B1 | 1/2003 | Barchi |
| 6,525,747 B1 | 2/2003 | Bezos |
| 6,529,475 B1 | 3/2003 | Wan et al. |
| 6,535,586 B1 | 3/2003 | Cloutier et al. |
| 6,539,421 B1 | 3/2003 | Appleman et al. |
| 6,549,937 B1 | 4/2003 | Auerbach et al. |
| 6,557,027 B1 | 4/2003 | Cragun |
| 6,559,863 B1 | 5/2003 | Megiddo |
| 6,564,248 B1 | 5/2003 | Budge et al. |
| 6,564,261 B1 | 5/2003 | Gudjonsson et al. |
| 6,571,234 B1 | 5/2003 | Knight et al. |
| 6,574,599 B1 | 6/2003 | Lim et al. |
| 6,580,790 B1 | 6/2003 | Henry et al. |
| 6,606,647 B2 | 8/2003 | Shah et al. |
| 6,615,241 B1 | 9/2003 | Miller et al. |
| 6,636,733 B1 | 10/2003 | Helferich |
| 6,640,230 B1 | 10/2003 | Alexander et al. |
| 6,654,683 B2 | 11/2003 | Jin et al. |
| 6,677,968 B1 | 1/2004 | Appelman |
| 6,677,976 B2 | 1/2004 | Parker et al. |
| 6,678,719 B1 | 1/2004 | Stimmel |
| 6,691,162 B1 | 2/2004 | Wick |
| 6,697,807 B2 | 2/2004 | McGeachie |
| 6,701,348 B2 | 3/2004 | Sommerer |
| 6,714,791 B2 | 3/2004 | Friedman |
| 6,714,793 B1 | 3/2004 | Carey et al. |
| 6,731,308 B1 | 5/2004 | Tang et al. |
| 6,732,155 B2 | 5/2004 | Meek |
| 6,738,822 B2 | 5/2004 | Fukasawa et al. |
| 6,747,970 B1 | 6/2004 | Lamb et al. |
| 6,748,421 B1 | 6/2004 | Ozkan et al. |
| 6,750,881 B1 | 6/2004 | Appelman |
| 6,757,365 B1 | 6/2004 | Bogard |
| 6,757,732 B1 | 6/2004 | Sollee et al. |
| 6,772,188 B1 | 8/2004 | Cloutier |
| 6,781,608 B1 | 8/2004 | Crawford |
| 6,785,554 B1 | 8/2004 | Amerga |
| 6,785,681 B2 | 8/2004 | Keskar et al. |
| 6,785,781 B2 | 8/2004 | Leenstra et al. |
| 6,788,769 B1 | 9/2004 | Waites |
| 6,795,863 B1 * | 9/2004 | Doty, Jr. ......................... 709/231 |
| 6,799,039 B2 | 9/2004 | Wu et al. |
| 6,800,031 B2 | 10/2004 | Di Cesare |
| 6,807,574 B1 | 10/2004 | Partovi et al. |
| 6,839,737 B1 | 1/2005 | Friskel |
| 6,857,006 B1 | 2/2005 | Nishizawa |
| 6,879,665 B1 | 4/2005 | Cook et al. |
| 6,901,559 B1 | 5/2005 | Blum et al. |
| 6,904,026 B1 | 6/2005 | Tarnanen et al. |
| 6,907,243 B1 | 6/2005 | Patel |
| 6,912,563 B1 | 6/2005 | Parker et al. |
| 6,912,564 B1 | 6/2005 | Appleman et al. |
| 6,917,965 B2 | 7/2005 | Gupta et al. |
| 6,920,478 B2 | 7/2005 | Mendiola et al. |
| 6,941,345 B1 | 9/2005 | Kapil et al. |
| 6,968,179 B1 | 11/2005 | DeVries |
| 6,993,564 B2 | 1/2006 | Whitten, II |
| 6,996,520 B2 | 2/2006 | Levin |
| 7,035,865 B2 | 4/2006 | Doss et al. |
| 7,039,676 B1 | 5/2006 | Day et al. |
| 7,043,530 B2 | 5/2006 | Isaacs et al. |
| 7,058,036 B1 | 6/2006 | Yu et al. |
| 7,058,690 B2 | 6/2006 | Maehiro |
| 7,065,186 B1 | 6/2006 | Myers et al. |
| 7,082,047 B2 | 7/2006 | Chow |
| 7,082,407 B1 | 7/2006 | Bezos et al. |
| 7,120,687 B1 | 10/2006 | Tessman, Jr. et al. |
| 7,124,123 B1 | 10/2006 | Roskind et al. |
| 7,127,232 B2 | 10/2006 | O'Neil et al. |
| 7,171,473 B1 | 1/2007 | Eftis et al. |
| 7,177,880 B2 | 2/2007 | Ruvolo |
| 7,185,059 B2 | 2/2007 | Daniell et al. |

| | | |
|---|---|---|
| 7,190,956 B2 | 3/2007 | Dorenbosch et al. |
| 7,200,634 B2 | 4/2007 | Mendiola et al. |
| 7,202,814 B2 | 4/2007 | Caspi et al. |
| 7,222,156 B2 | 5/2007 | Gupta et al. |
| 7,233,992 B1 | 6/2007 | Muldoon et al. |
| 7,275,215 B2 | 9/2007 | Werndorfer et al. |
| 7,313,760 B2 | 12/2007 | Grossman et al. |
| 7,436,780 B2 | 10/2008 | Stephens et al. |
| 7,437,413 B2 | 10/2008 | Okuyama et al. |
| 2001/0005861 A1 | 6/2001 | Mousseau et al. |
| 2001/0013050 A1 | 8/2001 | Shah |
| 2001/0052019 A1* | 12/2001 | Walters et al. ................ 709/231 |
| 2002/0015061 A1 | 2/2002 | Maguire |
| 2002/0021307 A1 | 2/2002 | Glenn et al. |
| 2002/0023132 A1 | 2/2002 | Tornabene et al. |
| 2002/0023134 A1 | 2/2002 | Roskowski et al. |
| 2002/0028595 A1 | 3/2002 | Higashi et al. |
| 2002/0042816 A1 | 4/2002 | Bae |
| 2002/0049717 A1 | 4/2002 | Routtenberg et al. |
| 2002/0049817 A1* | 4/2002 | Drory et al. ................... 709/206 |
| 2002/0056123 A1 | 5/2002 | Liwerant et al. |
| 2002/0065856 A1 | 5/2002 | Kisiel |
| 2002/0065894 A1 | 5/2002 | Dalal et al. |
| 2002/0077080 A1 | 6/2002 | Greene |
| 2002/0083136 A1 | 6/2002 | Whitten, II |
| 2002/0091667 A1 | 7/2002 | Jaipuria et al. |
| 2002/0095298 A1* | 7/2002 | Ewing ............................... 705/1 |
| 2002/0103801 A1 | 8/2002 | Lysons |
| 2002/0112181 A1 | 8/2002 | Smith |
| 2002/0116463 A1 | 8/2002 | Hart |
| 2002/0116641 A1 | 8/2002 | Mastrianni |
| 2002/0133292 A1 | 9/2002 | Miyaki |
| 2002/0133369 A1 | 9/2002 | Johnson |
| 2002/0147777 A1 | 10/2002 | Hackbarth et al. |
| 2002/0174010 A1 | 11/2002 | Rice, III |
| 2002/0175923 A1 | 11/2002 | Lin |
| 2002/0175953 A1 | 11/2002 | Lin |
| 2002/0181703 A1 | 12/2002 | Logan et al. |
| 2002/0184089 A1 | 12/2002 | Tsou et al. |
| 2002/0193942 A1 | 12/2002 | Odakura et al. |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0009385 A1 | 1/2003 | Tucciarone et al. |
| 2003/0009523 A1 | 1/2003 | Lindskog et al. |
| 2003/0018726 A1 | 1/2003 | Low et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0037112 A1 | 2/2003 | Fitzpatrick et al. |
| 2003/0043201 A1 | 3/2003 | Abdelhadi et al. |
| 2003/0046198 A1 | 3/2003 | Knapp et al. |
| 2003/0050916 A1 | 3/2003 | Ortega et al. |
| 2003/0084103 A1 | 5/2003 | Weiner et al. |
| 2003/0093580 A1 | 5/2003 | Thomas et al. |
| 2003/0105822 A1 | 6/2003 | Gusler et al. |
| 2003/0131061 A1 | 7/2003 | Newton et al. |
| 2003/0140103 A1 | 7/2003 | Szeto et al. |
| 2003/0167324 A1 | 9/2003 | Farnham et al. |
| 2003/0182394 A1 | 9/2003 | Ryngler et al. |
| 2003/0187813 A1 | 10/2003 | Goldman et al. |
| 2003/0212804 A1 | 11/2003 | Hashemi |
| 2003/0225847 A1 | 12/2003 | Heikes et al. |
| 2003/0236835 A1 | 12/2003 | Levi et al. |
| 2004/0015548 A1 | 1/2004 | Lee |
| 2004/0054729 A1 | 3/2004 | Fukuizumi et al. |
| 2004/0056901 A1 | 3/2004 | March et al. |
| 2004/0117443 A1 | 6/2004 | Barsness |
| 2004/0122681 A1 | 6/2004 | Ruvolo |
| 2004/0122810 A1 | 6/2004 | Mayer |
| 2004/0122855 A1 | 6/2004 | Ruvolo |
| 2004/0128356 A1 | 7/2004 | Bernstein et al. |
| 2004/0179039 A1 | 9/2004 | Blattner et al. |
| 2004/0186738 A1 | 9/2004 | Reisman |
| 2004/0210844 A1 | 10/2004 | Pettinati et al. |
| 2004/0215648 A1 | 10/2004 | Marshall |
| 2004/0215721 A1 | 10/2004 | Szeto et al. |
| 2004/0260762 A1 | 12/2004 | Fish |
| 2005/0015432 A1 | 1/2005 | Cohen |
| 2005/0021750 A1 | 1/2005 | Abrams |
| 2005/0027382 A1 | 2/2005 | Kirmse et al. |
| 2005/0038856 A1 | 2/2005 | Krishnasamy et al. |
| 2005/0043989 A1 | 2/2005 | Shifrin |
| 2005/0044152 A1 | 2/2005 | Hardy et al. |
| 2005/0050143 A1 | 3/2005 | Gusler et al. |
| 2005/0060377 A1 | 3/2005 | Lo et al. |
| 2005/0076241 A1 | 4/2005 | Appelman |
| 2005/0080863 A1 | 4/2005 | Danielf |
| 2005/0086211 A1 | 4/2005 | Mayer |
| 2005/0102202 A1 | 5/2005 | Linden et al. |
| 2005/0114229 A1 | 5/2005 | Ackley et al. |
| 2005/0153681 A1 | 7/2005 | Hanson |
| 2005/0197846 A1 | 9/2005 | Pezaris |
| 2005/0198173 A1 | 9/2005 | Evans |
| 2006/0010222 A1* | 1/2006 | Cleron et al. .................. 709/206 |
| 2006/0075044 A1 | 4/2006 | Fox et al. |
| 2006/0167991 A1 | 7/2006 | Heikes et al. |
| 2006/0168054 A1 | 7/2006 | Burkhart et al. |
| 2006/0173824 A1 | 8/2006 | Bensky et al. |
| 2006/0173963 A1 | 8/2006 | Roseway et al. |
| 2006/0182248 A1 | 8/2006 | Smith et al. |
| 2006/0212561 A1 | 9/2006 | Feng |
| 2006/0277187 A1 | 12/2006 | Roese et al. |
| 2007/0156664 A1 | 7/2007 | Norton et al. |
| 2008/0082620 A1 | 4/2008 | Barsness |
| 2009/0089316 A1 | 4/2009 | Kogan et al. |

FOREIGN PATENT DOCUMENTS

| | | |
|---|---|---|
| EP | 1176840 | 1/2002 |
| GB | 2319137 | 5/1998 |
| GB | 2357932 | 7/2001 |
| GB | 2368747 | 5/2002 |
| JP | 2008-314826 | 11/1996 |
| JP | 2000-499001 | 2/2000 |
| JP | 2000-259514 | 9/2000 |
| JP | 2000-284999 | 10/2000 |
| JP | 2001-084320 | 3/2001 |
| WO | WO 97/10558 | 3/1997 |
| WO | WO 97/14234 | 4/1997 |
| WO | WO 97/46955 | 12/1997 |
| WO | WO 98/16045 | 4/1998 |
| WO | WO 98/47270 | 10/1998 |
| WO | WO 99/08434 | 2/1999 |
| WO | WO 99/34628 | 7/1999 |
| WO | WO 99/48011 | 9/1999 |
| WO | WO 00/16201 | 3/2000 |
| WO | WO 00/24154 | 4/2000 |
| WO | WO 00/56723 | 9/2000 |
| WO | WO 00/60809 | 10/2000 |
| WO | WO 00/79396 | 12/2000 |
| WO | WO 01/06748 | 1/2001 |
| WO | WO 01/22258 | 3/2001 |
| WO | WO 01/24036 | 4/2001 |
| WO | WO 01/43357 | 5/2001 |
| WO | WO 01/67787 | 9/2001 |
| WO | WO 01/72020 | 9/2001 |
| WO | WO 01/80079 | 10/2001 |
| WO | WO 02/03216 | 1/2002 |
| WO | WO 02/35781 | 5/2002 |
| WO | WO 02/062039 | 8/2002 |
| WO | 02/073886 | 9/2002 |
| WO | WO 02/073886 | 9/2002 |
| WO | WO 2004/028178 | 4/2004 |
| WO | WO 2005/086723 | 9/2005 |

OTHER PUBLICATIONS

"A Reputation System for Peer-to-Peer Networks," Gupta et al., Jun. 1-3, 2003, NOSSDAV'03, Monterey, California, pp. 144-152.
"About File Transfers", AOL Instant Messenger, version 4.3, Help Documentation, available on Jul. 21, 2001, 5 pages.
"About Internet directory services," Outlook 2000 SR-1 (9.0.0.4527) Help File, on or before Aug. 10, 2001, p. 1.
"Active Directory Features," [online], Jun. 15, 1999 [retrieved on May 13, 2003]. Retrieved from the Internet http://www.microsoft.com/windows2000/server/evaluation/fearures/adlist.asp, pp. 1-4.
"Active Directory Service Overview," [online], Nov. 30, 2001

[retrieved on May 13, 2003]. Retrieved from the Internet http://www.microsoft.com/windows2000/server/evaluation/business/-addatasheet.asp, pages 105.
"Active Directory," [online], retrieved on May 13, 2003]. Retrieved from the Internet http://www.microsoft.com/windows2000/technologies/directorv/AD/default.asp, pp. 1-13.
"AOL Instant Messenger All New Version 2.0", 2 pages, Jun. 24, 1999.
"AOL Instant Messenger", reprinted from http://web.archive.org/web/20010721193059/http://aim.com/ (Way Back Machine—available on Jul. 21, 2001) on Aug. 26, 2005, 7 pages.
"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
"AOL technology: turning complicated things into engaging services", 1996 Annual Report, 22 pages.
"Benefits of Active Directory in a Windows 2000 Environment," [online], Sep. 20, 2001 [retrieved on May 13, 2003]. Retrieved from the Internet http://www.microsoft.com/windows2000/-server/evaluation/business/adwin2k.asp, pp. 1-9.
"BestCalls.com Announces the BestCalls Technology Index," Business Wire, Jun. 30,1999, Business Wire, p. 1.
"Better Bayesian Filtering," Paul Graham, Jan. 2003, pp. 1-11, http://www.paulgraham.co/better.html.
"Business at Cyberspeed; Brainstorm Becomes Quick Internet Hit," Walker, Jan. 24, 1999, The Washington Post, p. A.01 (4 total pages).
"Degrees of Separation Email Spam Protection," Halfbakery: Degrees of Separation Email Spam Protection, reprinted from http://halfbakery.com/idea/Degrees_20of_20Separation_20Email_20Protecti... printed on Mar. 1, 2004 (3 pages).
"Digital Artifacts for Remembering and Storytelling: Post History and Social Network Fragments," Viegas et al., retrieved from World Wide Web: http://we.media.mit.edu/~fviegas/papers/posthistory_snf.pdf, 10 total pages (Jan. 2004).
"Directory Integration Can Lower Total Cost of Ownership and Increase Application Functionality," [online], Jul. 27, 1998 [retrieved on May 13, 2003]. Retrieved from the Internet http://www.microsoft.com/presspass/press/1998/Jul98/ActivDPR.asp, pp. 1 of 4.
"Enterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims.asp?fra...>, pp. 1-16.
"Finding Others Online: Reputation Systems for Social Online Spaces," Jensen et al., Apr. 20-25, 2002, CHI, Minneapolis, Minnesota, vol. 4, Issue 1, pp. 447-454.
"Frequently Asked Questions About AOL Instant Messenger", 6 pages, Jun. 24, 1999.
"GLWebMail 2.0 is released!" http://www.gordano.com; available on Apr. 18, 2001, reprinted from http://web.archive_org/web/20010418153714//http://www.gordano.com.
"Hottie or Nottie? Web Site Voters Let You Know Whether You Sizzle or Fizzle," Marino, Jul. 11, 2001, Florida Times Union, p. C. 1, 2 pages.
"Icq.anywhere, Email Features—Email Center—ICQ.com," retrieved Apr. 29, 2004 from the World Wide Web: http://www.ico.com/email/popular-features.html, pp. 1-5.
"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnlx=0&adxnnlx=107029..., printed on Nov. 5, 2004 (2 pages).
"Instant Messaging for Gamers," PC Gamer, May 2004, vol. 11, No. 5, p. 28.
"Integrating Applications with Windows 2000 and Active Directory," [online], Oct. 2000 [retrieved on May 8, 2003]. Retrieved from the Internet <http://www.microsoft.com/technet/-prodtechnol/ad/windows2000/evaluate/adappstr.asp?fra...>, pp. 1-12.
"Integrating Microsoft Metadirectory Services and Active Directory," [online], Aug. 31, 2000 [retrieved on May 13, 20033]. Retrieved from the Internet http://www.microsoft.com/windows2000/-server/evaluation/business/adwin2k.asp, p. 1.
"Introducing the Gordano Messaging Suite"; http://www.gordano.com; Copyright 1994-2003 Gordano (1 page).
"Learning Spam: Simple Techniques for Freely-Available Software," Bart Massey et al, Computer Science Dept., Portland, OR USA, 2003, pp. 1-14.
"Learning to Filter Spam E-Mail: A Comparison of a Naïve Bayesian and a Memory-Based Approach," Ion Adroutsopoulos et al., University of Athens, Sep. 2000, pp. 1-12.
"Look up contact information from an item," Outlook 2000 SR-1 (9.0.0. 4527) Help File, on or before Aug. 2001, p. 1.
"Lotus Instant Messaging Everyplace FAQ," retrieved Apr. 29, 2004 from the World Wide Web: http://www.lotus.com/products/product4.nsf/wdocs/249c6f083166cd3e85256d7300714407, pp. 1-3.
"New Features in AOL Instant Messenger for Windows v. 2.01 Beta", 2 pages, Apr. 28, 1999.
"Part I: Active Directory Operations," Active Directory Operations Guide, Microsoft Corporation, Microsoft Windows 2000, Version 1.5, pp. 1-187.
"Part II: Tasks and Procedures Appendices," Active Directory Operations Guide, Microsoft Corporation, Microsoft Windows 2000, Version 1.5, pp. 1-131.
"PieSpy—Inferring and Visualizing Social Network on IRC," PieSpy Social Network Bot, reprinted from http://lister.linux-srv.anix.net/piespy printed on Mar. 11, 2004 (18 pages).
"plaxo," Plaxo, reprinted from http://web.archive.org/web/20041105072256/http://www.pfaxo.com/ printed on Nov. 5, 2004 (available on Feb. 14, 2004) (2 pages).
"Plaxo-Update Your Address Book," Plaxo Contact Networks, reprinted from http://web.archive.org/web/20030218233638/http://www.plaxo.com/ printed on Nov. 5, 2004 (available on Feb. 18, 2003) (1 page).
"Quick Tips for Getting Started", 5 pages, Jun. 24, 1999.
"Reflections on Friendster, Trust and Intimacy," Danah Boyd. *Ubicomp 2003*, Workshop Application for the Intimate Ubiquitous Computing Workshop. Seattle, WA, Oct. 12-15, 2003, 4 pages.
"Reputation Systems," Resnick et al., Dec. 2000, Communications of the ACM, vol. 43, No. 12, pp. 45-48.
"RIM Road: Software: Internet & Network: Webmessenger RIM J2ME/Instant Messaging,* retrieved Apr. 29, 2004 from the World Wide Web: http://www_rimrod.com/software/rim1/Webmessenger-RIM-J2ME-Instant -Messaging-20...," pp. 1-4.
"Set up LDAP directory services," Outlook 2000 SR-1 (9.0.0. 4527) Help File, on or before Aug. 10, 2001, 1 page.
"Six Degrees—New Programs Help Companies 'Mine Workers' Relationships for Key Business Prospects," William M. Bulkeley et al., Marketplace, The Wall Street Journal, Aug. 4, 2003. (3 pages).
"Social Nets Find Friends in VCs." Joanna Glasner. http://www.wired.com/news , Nov. 17, 2003, pp. 1-3.
"Social Network Fragments: An Interactive Tool for Exploring Digital Social Connections." Danah Boyd, Jeff Potter. Sketch at *SIGGRAPH 2003*. San Diego, California: ACM, Jul. 27-31, 2003.
"Social Networking for Business: Release 0.5," Esther Dyson, Esther Dyson's Monthly Report, vol. 21, No. 10, Nov. 25, 2003, www.edventure.com. (36 pages).
"Social Networks: Deodorant for the Soul?," Esther Dyson, Esther Dyson's Monthly Report, vol. 21, No. 11, Dec. 12, 2003, www.edventure.com, (36 pages).
"Social Sites Clicking With Investors," Washingtonpost.com: Social Sites Clicking With Investors, reprinted from http://www.washingtonpostcom/ac2/wp-dyn/A32066-2003Nov12?language=printer printed on Nov. 5, 2004.
"Socialware: Multiagent Systems for Supporting Network Communities," Hattori et al., Mar. 1999, Association for Computing Machinery, Communications of the ACM, vol. 42, Issue 3, pp. 55ff.
"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).
"Support Vector Machines for Spam Categorization," Harris Drucker et al., IEEE Transactions on Neural Networks, vol. 10, No. 5, Sep. 1999, pp. 1048-1054.
"Support Vector Machines," Marti Hearst, IEEE Intelligent Systems, Jul./Aug. 1998, pp. 18-28.

"SVM-based Filtering of E-mail Spam with Content-specific Misclassification Costs," Aleksander Kolcz et al., *TextDM'2001 (IEEE ICDM-2001 Workshop on Text Mining)*, San Jose. CA, 2001, pp. 1-14.

"SWF Seeks Attractive Head Shot; To Stand Out, Online Daters Pay for Professional Photos; Cropping out the Ex-Wife," Leiber, Nov. 19, 2003, The Wall Street Journal, p. D.1.

"Technical Solutions for Controlling Spam," Shane Hird, Proceedings of AUUG2002, Melbourne, Sep. 4-6, 2002, 17 pages.

"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).

Telstra targets Net spammers,* J. Dudley, news.com.au, Dec. 2, 2003, 2 pages.

"Text Categorization with Support Vector Machines: Learning with Many Relevant Features," Thorsten Joachims, University of Dortmund, Computer Science Dept., LS-8 Report 23, 1998, 18 pages.

"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).

"The LP Wireless Messenger", Messenger Documentation, http://www.lpwireless.com/messengerhelp.htm, pp. 1-7. available on Dec. 9, 2002, reprinted from http://web.archive.org/web20021209025321/http//lpwireless.com/messengerhelp-htm.

Trillian Discussion Forums—HOWTO: import ICQ 2003a Contact List,* retrieved Apr. 29, 2004 from the World Wide Web: http://trillian.cc/forums/showthread.php?s+&threadid=36475, pp. 1-2.

"Using Active Directory Service", from Chapter 5, Microsoft Windows 2000 Administrator's Pocket Consultant, by William R. Stank (1999). Retrieved from http://www.microsoft.com/technet/prodtechnol/ad/windows2000/evaluate/05w2kadb.asp?fr..., pp. 1-6.

"Welcome to Huminity World of Connections," Huminity-Home, reprinted from http://web.archive.org/web/20030228131435/www.huminity.com/default.php?intemationa... printed on Nov. 5, 2004 (available on Feb. 2, 2003) (1 page).

"What is AOL Instant Messenger", 3 pages, Jun. 24, 1999.

What new about exchanging information over the Internet, Outlook 2000 SR-1 (9.0.0.4527) Help File, on or before Aug. 10, 2001, p. 1.

"Will You Buy a Car From This Man?," Leander Kahney, Oct. 6, 2003. pp. 1-3.

"Windows 2000 Directory Services", [online] http://www.mircrosoft.com/windows2000/technologies/directory/default.asp as of Nov. 25, 2001 according to the Internet Archive Wayback Machine, available at http://web.archive.org/web20011625224156/http://www.microsoft.com/windowns_2000/technologies/directory/default_asp, 1 page.

"Windows 2000 Directory Services," [online], [retrieved on May 13, 2003). Retrieved from the Internet http://www.microsoft.com/windows2000/technolopies/directory/default.asp, pp. 1-2.

"Windows NetMeeting —Features", [Online], Jun. 17, 1999, XP002245623, Retrieved from the Internet: URL:http://www.microsoft.com/windows/NetMeetingo/Features/default.ASP>, 8 pages.

Working with Active Directory Domains*, from Chapter 5, *Microsoft Windows 2000 Administrator's Pocket Consultant*, by William R. Stank (1999). Retrieved from http://www.microsoft.com/technet/prodtechnol/ad/windows2000/evaluate/05w2kadb.asp?fr..., pp. 1-10.

"YAHOO! Messenger Makes the World a Little Smaller, More Informed", pp. 1-2, Jun. 21, 1999.

Alan Cohen, "Instant Messaging", Apr. 13, 1999, PC Magazine, PC Labs, 2 pages.

America Online Inc., "AOL Instant Messenger", 1999, Internet: www.aol.com/aim/.

America Online Inc., "New AIM 4.7", Sep. 27, 2001, Internet: http://aim.aol.com.

Anand Ranganalhan et al., "ConChat: A Context-Aware Chat Program", 2002, Pervasive Computing, pp. 51-57.

Announce: Implementation of E-mail Spam Proposal, Maurice I. Marvin, news.admin.net-abuse.misc, Aug. 3, 1996, 2 pages.

Anonymous: "Push to Talk™ Services", Internet Document, [Online], p. 1, Retrieved from the Internet: URL:http://www.nextel.com/services/directconnect/ptt_overview.shtml [retrieved on Dec. 29, 2003].

Anonymous: "The Internet—the Advent of New Forms of Communication", Internet Document, [Online], pp. 1-4, Retrieved from the Internet: URL:http://journal.fujitsu.com/248e/e48now.html [retrieved on Dec. 29, 2003].

Archive.org archived "About File Transfers", AOL Instant Messenger, version 4.3, Help Documentation [online] Jul. 21, 2001 (5 pages).

Archive.org archived "AOL Instant Messenger," [online] Jul. 21, 2001 (7 pages).

Archive.org archived the Morpheus 1.9. 2 pages on clnet Download. com [online] Jun. 20, 2002 (2 pages).

Archive.org archived the Morpheus 1.9.1 download page on clnet Download.com [online] Aug. 3, 2002 [accessed Feb. 14, 2007], Retrieved from Internet, URL:/http://web.archive.org/web/20020803071751/download.com.com/3000-2166-10057840.html>.

Archive.org archived the MusicCity Morpheus download page on clnet Download.com [online] Apr. 12, 2001 [from file of U.S. Appl. No. 09/911,799] (2 pages).

Archive.org archived the MusicCity Morpheus download page on clnet Download.com [online] Oct. 8, 2001 [accessed Feb. 14, 2007], Retrieved from Internet, URL:http://web.archive.org/web/20011008191757/download.cnet.com/downloads/0-1896420-100-5590701.htm>.

Australian Office Action of Apr. 7, 2006, App. No. 2002340039 (2 pages).

BuddyGopher~About, available on Jul. 13, 2004, reprinted from http://web.archive.org/web/20040713002836/www.buddygopher.com/about.html on Sep. 28, 2005 (4 pgs).

BuddyGopher-We Love Away Messages!, "BuddyGopher simultaneously checks the away messages of your favorite AIM® buddies.", available on Sep. 24, 2004, reprinted from http://web.archive.org/web/20040924104001/http://www.buddygopher.com/ on Sep. 28, 2005 (2 pgs).

Canadian Office Action from Application No. 2,403,520, dated Feb. 21, 2005.

Carlos Jensen et at., "Finding Others Online: Reputation Systems for Social Online Spaces", Apr. 2002, Paper: Group Spaces, pp. 447-454.

Chinese Office Action of Jul. 7, 2006, App. No. 02821420X (5 pages).

CNET Networks Inc., "PopUp Killer", Sep. 13, 2001, Internet: download.cnet.com/downloads/0-10059-100-6932612.html.

International Search Report and Written Opinion dated Feb. 15, 2006 for International Application No. PCT/US05/07204, 10 pages.

International Search Report for International Application No. PCT/US03/15715, mailed Aug. 14, 2003.

European Search Report mailed Aug. 30, 2005 for International Application No. EP03731244 (4 pages).

Notice of Allowance for U.S. Appl. No. 10/184,002 dated Jul. 24, 2008, 20 pages.

Office Action issued in U.S. Appl. No. 10/981,460, dated Aug. 20, 2008, 24 pages.

Office Action issued in U.S. Appl. No. 10/134,437, dated Mar. 10, 2009, 31 pages.

Office Action issued in U.S. Appl. No. 10/334,056, dated Jul. 6, 2005, 24 pages.

Office Action issued in U.S. Appl. No. 10/334,056, dated May 10, 2006, 7 pages.

Office Action issued in U.S. Appl. No. 10/334,056, dated May 12, 2008, 22 pages.

Office Action issued in U.S. Appl. No. 10/334,056, dated May 21, 2007, 7 pages.

Office Action issued in U.S. Appl. No. 10/334,056, dated Nov. 29, 2004, 22 pages.

Office Action issued in U.S. Appl. No. 10/334,056, dated Nov. 5, 2007, 21 pages.

Office Action issued in U.S. Appl. No. 10/334,056, dated Oct. 31, 2005, 7 pages.

Office Action issued in U.S. Appl. No. 11/015,424, dated Mar. 19, 2008, 43 pages.

Office Action issued in U.S. Appl. No. 11/015,424, dated Nov. 3, 2008, 49 pages.
Office Action issued in U.S. Appl. No. 11/017,204 dated Jun. 23, 2008, 33 pages.
Office Action issued in U.S. Appl. No. 11/017,204, dated Dec. 12, 2007, 13 pages.
Office Action issued in U.S. Appl. No. 11/238,110 dated Jul. 9, 2008, 11 pages.
Office Action issued in U.S. Appl. No. 11/238,110 dated Oct. 9, 2008, 12 pages.
Office Action issued in U.S. Appl. No. 11/238,110, dated Nov. 29, 2007, 11 pages.
Office Action issued in U.S. Appl. No. 11/238,129 dated May 28, 2008, 70 pages.
Office Action issued in U.S. Appl. No. 11/238,129 dated Nov. 14, 2007, 35 pages.
Office Action issued in U.S. Appl. No. 11/238,130 dated Apr. 14, 2009, 35 pages.
Office Action issued in U.S. Appl. No. 11/238,130 dated Nov. 13, 2008, 45 pages.
Office Action issued in U.S. Appl. No. 10/184,002, dated Jan. 8, 2008, 19 pages.
Office Action issued in U.S. Appl. No. 10/134,437 dated Sep. 18, 2008, 32 pages.
Office Action mailed approximately Feb. 19, 2006 for Japanese Patent Application No. 2002-515026.
Supplementary European Search Report issued in European Application No. EP05728303, dated Jan. 9, 2009, (2 pages).
Courter et al., "Mastering Microsoft Outlook 2000 Premium Edition", Sybex Inc., Alameda, California, 2000, pp. 167-169, ISBN 0-7821-2676-6.
CrushPartY.com: Help, retrieved Jun. 12, 2002 from the World Wide Web: http://www.crushparty.com/help.jsp, 3 pages.
Decision on Appeal, U.S. Appl. No. 10/146,814, Mar. 22, 2010 (12 pages).
Dodgeball.com:: mobile social software, "help: text messaging", available on Oct. 13, 2004, reprinted from http://web.archive.org/web/20041013034241_/www.dodgeball.com/social/help_text.php on Sep. 28, 2005 (3 pages).
Dodgeball.com:: mobile social software, "help: the basics", available on Oct. 9, 2004, reprinted from http://web.archive.ora/web/20041009200739/www.dodgeball.com/social/help_basics.php on Sep. 28, 2005 (2 pages).
Dodgeball.com:: mobile social software, "help: use it", available on Oct. 9, 2004, reprinted from http://web.archive.ora/web/20041009201853/www.dodaeball.com/social/help_useit.php on Sep. 28, 2005 (2 pages).
Dodgeball.com:: mobile social software, "Hook up with friends. Discover what's around you", available on Nov. 30, 2003, reprinted from http://web.archive.org/web/20041130034344/www.dodgeball.com/social/index.php on Sep. 28, 2005 (2 pages).
Dutta-Roy Amitava, "Virtual Meetings with Desktop Conferencing", IEEE Spectrum, vol. 35, No. 7, Jul. 1, 1998, pp. 47-56.
Ed Bott and Ron Person, Using Windows 95 with Internet Explorer 4.0, Feb. 17, 1998, Que, Special Edition. 13 pages.
Eschenburg, Axel, Wo laufen sie denn?, Oct. 26, 1998, pp. 92-95.
European Office Action in Application No. 01954931.0-2414, mailed Jul. 14, 2008, 3 pages.
European Patent Office, Communication of Aug. 30, 2005, App. No. 03731244.4-2416 (PCT/US0315715) (4 pages).
European Patent Office, Communication of Aug. 31, 2009, App. No. 02778374.5-1238 (8 pages).
European Patent Office, Communication of Sep. 5, 2006, App. No. 02778374.5-1238 (4 pages).
European Search Report mailed Aug. 30, 2005 for European Application No. 03731244.
Examiner's Answer mailed Jan. 10, 2008 by USPTO in U.S. Appl. No. 09/810,159, 11 pages.
Examiner's Answer mailed Jan. 12, 2009 by USPTO in U.S. Appl. No. 10/146,814, 19 pages.
Examiner's Answer mailed Aug. 19, 2009 by USPTO in U.S. Appl. No. 11/150,180, 11 pages.
Final Office Action mailed Apr. 29, 2005, from U.S. Appl. No. 09/911,799 (15 pages).
Final Office Action mailed Apr. 29, 2008, from U.S. Appl. No. 10/747,697 (23 pages).
Final Office Action mailed Aug. 11, 2006, from U.S. Appl. No. 09/911,799 (12 pages).
Final Office Action mailed Aug. 21, 2007, from U.S. Appl. No. 10/747,623 (17 pages).
Final Office Action mailed Jun. 23, 2008, from U.S. Appl. No. 10/747,623 (19 pages).
Final Office Action mailed Mar. 18, 2009, from U.S. Appl. No. 09/911,799 (28 pages).
Final Office Action mailed Nov. 1, 2007, from U.S. Appl. No. 10/747,624 (17 pages).
Gupta et al., "A Reputation System for Peer-to-Peer Networks," Jun. 1-3, 2003, NOSSDAV'03, California, pp. 144-152. Monterey.
Home-tribe.net. http://washingtondc.tribe.net/message/24434d1b-817b-4580-aa42-3bffa15f26a?page=1 (4 total pages, reprinted on Dec. 13, 2004).
http://www.friendster.com (17 pages, reprinted on Dec. 13, 2004).
IBM "Configuring Sametime servers in your Domino environment" May 1, 2000 (14 pages).
International Search Report and Written Opinion dated Feb. 15, 2006 for International Application No. PCT/US05/07204, 14 pages.
International Search Report and Written Opinion for PCT/US2005/042992, Mar. 6, 2007 (14 pages).
International Search Report dated Oct. 16, 2006, for PCT/US05/08476, 9 pages.
International Search Report, PCT/US05/45663, dated Apr. 11, 2008, 10 pages.
International Search Report Opinion, PCT/US05/45663, dated Apr. 11, 2008, 6 pages.
International Search Report, PCT/US2006/018286, dated Oct. 19, 2006, 12 pages.
Isaacs, Ellen: "Example UI Spec: Sound Instant Messages", Internet Document, [Online], pp. 1-2. Retrieved from the Internet: URL:http://www.uidesigns.com/spec/d-sims.html [retrieved on Jun. 26, 2003].
J.C. Cannon, "Design Guide for Directory-Enabled Applications," [online], Apr. 2001 [retrieved on May 13, 2003]. Retrieved from the Internet http://msdn.microsoft.com/library/en-us/dnactdir/html/deal.asp?frame=true>, pp. 1-18.
Japanese Office Action of May 12, 2008, App. No. 2003-533140 (5 pages).
Klaus Hartenstein et al., "xhtalk 2.9", © Nov. 1992, 6 pages.
Kohda et al., IMPP: A New Instant Messaging Standard and Its Impact on Internet Business, Dec. 2000, Fujitsu Sci. Tech. J., 36, 2, pp. 147-153.
Lotus Sametime 1.5 1999 (4 pages).
Mariano, Gwendolyn. ZDNetNews. "Morpheus 1.9 to be unleashed", [online] Jun. 10, 2002 [accessed Feb. 14, 2007], Retrieved from Internet URL:http:/zdnetcom/2100-3513_22-934615.html (6 pages).
Mary Beth Marklein, "Student have 'away' with words", Mar. 28, 2004, USA Today, http://www.usatoday_.com/tech/news/2004-03-28-aways-messages-usat_x.htm, 4 pages.
Matsumoto, Tatsuro et al.: "Chocoa Communicator—A New Communication System Based on Awareness and Text Communications—", Fujitsu Sci. Tech. J.,36,2, pp. 154-161, Dec. 2000.
Maurice L. Marvin, "Announce: Implementation of E-mail Spam Proposal," news.admin.net-abuse.misc, Aug. 3, 1996, 2 pages.
Mckendrick, Joseph; "Internet Call Centers: New Era in Customer Service", EC World, Feb. 2002; vol. 10, No. 2, pp. 22-24 and 26.
Microsoft Corporation, "Active Directory Services Interface in the Microsoft Exchange 5.5 Environment," [online], Nov. 1997 [retrieved on May 13, 2003]. Retrieved from the Internet http://msdn.microsoft.com/library/enus/dnactdir/html/msdn_adsiexch.asp?frame=true, (16 pages).
Microsoft Corporation, "Comparing Microsoft Active Directory to Novell's NDS," [online], Sep. 1998 retrieved on May 13, 2003]. Retrieved from the Internet http://msdn.microsoft.-com/library/enus/dnactdir/html/msdn_activedirvsnds.asp?frame=true, pp. 1-17.

Microsoft Corporation, "Active Directory Services Interface in the Microsoft 5.5 Environment," Nov. 1997, pp. 1-12.
Microsoft Corporation, "Using ADSI, LDAP, and Network Management Functions With Active Directory," [online], Feb. 2002 [retrieved on May 13, 2003]. Retrieved from the Internet http://msdn.microsoft.com/library/enus/dnactdir/html/BuildingADApps.asp?frame=true, pp. 1-9.
Mike Snider, "America goes online for New Year's bash", USA Today, p. 3D, Jan. 2, 2000.
Morris et al. Apparatus and Method for Establishing an Audio Conference in a Networked Environment, WIPO, Pb No. WO 00/60809, (3 pages).
Muller, Nathan, "Dial 1-800-Internet"; Feb. 1996, pp. 83-84, 86, 88.
Mutton, Paul, "PieSpy Social Network Bot Inferring and Visualizing Social Networks IRC," Dec. 4, 2003, Internet Archive Wayback Machine http://web.archive.org/web/20031204185952/http://jibble.org/piespy, 17 pages.
Mutton, Paul, "PieSpy Social Network Bot Inferring and Visualizing Social Networks on IRC," Dec. 4, 2003, Internet Archive Wayback Machine http://web.archive.org/web/20040620221729/jibble.org/piespy, 11 pages.
Neo Mai, Ken Neo. "Buying and selling on the Internet; [Computimes, 2* Edition]." New Straits Times. Kuala Lumpur: Jun. 28, 2001. p. 53.
Notice of Allowability in U.S. Appl. No. 10/134,437, Nov. 17, 2009 (3 pages),.
Notice of Allowance and Fee(s) Due in U.S. Appl. No. 10/134,437 dated Oct. 2, 2009, (6 pages).
Office Action dated Sep. 18, 2008, in U.S. Appl. No. 10/134,437 (32 pages).
Office Action for U.S. Appl. No. 10/633,636 mailed Oct. 11, 2006 (11 pages).
Office Action issued on Jan. 8, 2008 by USPTO in U.S. Appl. No. 10/184,002 (14 pages).
Office Action issued on Jan. 11, 2008 by USPTO in U.S. Appl. No. 09/810,159 (12 pages).
Office Action issued on Jan. 12, 2009 by USPTO in U.S. Appl. No. 10/146,814 (19 pages).
Office Action issued on Jan. 29, 2010 by USPTO in U.S. Appl. No. 09/810,159 (14 pages).
Office Action issued on Feb. 11, 2005 by USPTO in U.S. Appl. No. 09/810,159 (10 pages).
Office Action issued on Feb. 11, 2008 by USPTO in U.S. Appl. No. 10/134,437 (34 pages).
Office Action issued on Feb. 26, 2007 by USPTO in U.S. Appl. No. 10/747,624 (15 pages).
Office Action issued on Mar. 10, 2009 by USPTO in U.S. Appl. No. 10/134,437 (31 pages).
Office Action issued on Mar. 13, 2007 by USPTO in U.S. Appl. No. 10/747,623 (17 pages).
Office Action issued on Mar. 22, 2010 by USPTO in U.S. Appl. No. 10/146,814 (14 pages).
Office Action issued on Mar. 28, 2006 by USPTO in U.S. Appl. No. 09/843,788 (22 pages).
Office Action issued on Mar. 30, 2004 by USPTO in U.S. Appl. No. 09/843,788 (14 pages).
Office Action issued on Apr. 2, 2009 by USPTO in U.S. Appl. No. 11/237,718 (18 pages).
Office Action issued on Apr. 7, 2008 by USPTO in U.S. Appl. No. 11/150,180 (8 pages).
Office Action issued on Apr. 15, 2008 by USPTO in U.S. Appl. No. 10/146,814 (20 paes).
Office Action issued on Apr. 19, 2007 by USPTO in U.S. Appl. No. 09/843,788 (16 pages).
Office Action issued on Apr. 20, 2006 by USPTO in U.S. Appl. No. 10/184,002 (15 pages).
Office Action issued on Apr. 29, 2008 by USPTO in U.S. Appl. No. 10/747,679 .(22 pages).
Office Action issued on May 5, 2010 by USPTO in U.S. Appl. No. 09/843,788 (18 pages).
Office Action issued on May 18, 2006 by USPTO in U.S. Appl. No. 10/134,347 (26 pages).
Office Action issued on May 19, 2006 by USPTO in U.S. Appl. No. 09/810,159 (10 pages).
Office Action issued on May 22, 2006 by USPTO in U.S. Appl. No. 10/146,814 (14 pages).
Office Action issued on Jun. 12, 2006 by USPTO in U.S. Appl. No. 09/843,788 (4 pages).
Office Action issued on Jun. 15, 2005 by USPTO in U.S. Appl. No. 09/810,159 (8 pages).
Office Action issued on Jun. 23, 2008 by USPTO in U.S. Appl. No. 10/747,623 (19 pages).
Office Action issued on Jul. 2, 2007 by USPTO in U.S. Appl. No. 10/146,814 (16 pages).
Office Action issued on Jul. 6, 2004 by USPTO in U.S. Appl. No. 09/810,159 (12 pages).
Office Action issued on Jul. 16, 2007 by USPTO in U.S. Appl. No. 10/747,624 (7 pages).
Office Action issued on Jul. 27, 2005 by USPTO in U.S. Appl. No. 09/843,788 (19 pages).
Office Action issued on Aug. 4, 2010 by USPTO in U.S. Appl. No. 12/336,880 (12 pages).
Office Action issued on Aug. 19, 2009 by USPTO in U.S. Appl. No. 11/150,180 (15 pages).
Office Action issued on Aug. 21, 2006 by USPTO in U.S. Appl. No. 10/134,437 (4 pages).
Office Action issued on Aug. 21, 2007 by USPTO in U.S. Appl. No. 10/747,623 (17 pages).
Office Action issued on Aug. 25, 2005 by USPTO in U.S. Appl. No. 10/184,002 (13 pages).
Office Action issued on Sep. 15, 2008 by USPTO in U.S. Appl. No. 09/843,788 (17 pages).
Office Action issued on Sep. 18, 2008 by USPTO in U.S. Appl. No. 10/134,437 (32 pages).
Office Action issued on Sep. 20, 2005 by USPTO in U.S. Appl. No. 10/146,814 (20 pages).
Office Action issued on Oct. 2, 2007 by USPTO in U.S. Appl. No. 10/747,679 (33 pages).
Office Action issued on Oct. 2, 2007 by USPTO in U.S. Appl. No. 11/150,180 (5 pages).
Office Action issued on Oct. 31, 2007 by USPTO in U.S. Appl. No. 09/843,788 (4 pages).
Office Action issued on Nov. 1, 2005 by USPTO in U.S. Appl. No. 10/134,437 (21 pages).
Office Action issued on Nov. 1, 2007 by USPTO in U.S. Appl. No. 10/747,624 (.17 pages).
Office Action issued on Nov. 14, 2007 by USPTO in U.S. Appl. No. 10/747,623 (18 pages).
Office Action issued on Dec. 2, 2004 by USPTO in U.S. Appl. No. 09/843,788 (23 pages).
Office Action issued on Dec. 2, 2005 by USPTO in U.S. Appl. No. 09/810,159 (9 pages).
Office Action issued on Dec. 11, 2006 by USPTO in U.S. Appl. No. 10/146,814 (15 pages).
Office Action mailed Feb. 26, 2007, from U.S. Appl. No. 10/747,624 (16 pages).
Office Action mailed Mar. 13, 2007, from U.S. Appl. No. 10/747,623 (17 pages).
Office Action mailed Nov. 14, 2007, from U.S. Appl. No. 10/747,623 (18 pages).
Office Action mailed Oct. 2, 2007, from U.S. Appl. No. 10/747,679 (33 pages).
Office Action of Canadian Application No. 2,462,037. dated Feb. 12, 2009 (10 pages).
Office Action of U.S. Appl. No. 10/134,437, dated Mar. 10, 2009, (31 pages).
Office Action of U.S. Appl. No. 10/184,002, dated Jan. 8, 2008, (14 pages).
Office Action of U.S. Appl. No. 10/184,002, dated Jan. 9, 2007, (11 pages).
Office Action of U.S. Appl. No. 11/015,424, dated Mar. 19, 2008, (42 pages).
Office Action of U.S. Appl. No. 11/015,424, dated May 1, 2009, (47 pages).

Office Action of U.S. Appl. No. 11/237,718, dated Apr. 2, 2009, (19 pages).
Office Action, U.S. Appl. No. 09/843,788, dated Apr. 19, 2007, (17 pages).
Office Action, U.S. Appl. No. 10/134,437, dated Feb. 11, 2008, (34 pages).
Office Action, U.S. Appl. No. 10/146,814, dated Apr. 15, 2008, (20 pages).
Office Action, U.S. Appl. No. 10/146,814, dated Dec. 11, 2006, (15 pages).
Office Action, U.S. Appl. No. 10/146,814, dated Jul. 2, 2007, (17 pages).
Office Action, U.S. Appl. No. 10/184,002 dated Jan. 9, 2007, (11 pages).
PCT International Search Report of Apr. 11, 2003, App. No. PCT/USOO/35160 (3 pages).
PCT International Search Report of Jan. 9, 2003, App. No. PCT/US02/30730 (5 pages).
Powwow (Mar. 1, 2000), Introduction, Retrieved Apr. 3, 2006 from website: http://web.archive.org/web/20000301125635/ww2.tribal.com/help/online docs/h205voic.html.
Pruitt, Scarlet. IDG News Service. "Morpheus Updates Peer-to-Peer Client" [online] Jun. 20, 2002 [from file of U.S. Appl. No. 09/911,799] (3 pages).
R. Movva & W. Lai, "MSN Messenger Service 1.0 Protocol", Aug. 1999. Internet Draft. http://tools.ietforg/id/draft-movva-msn-messenger-protocol-oo.txt, 28 pages.
Reichard, K., "AOL, ICQ to Interoperate—But in a Limited Fashion," Oct. 30, 2002, InstantMessagingPlanet, available at www.instantmessagingplanet.com/public/article.php/1490771, 4 pages.
Ryze home page, www.ryze.com, Dec. 21,2003, available at http://web.archive.org/web/20031221010006/http://ryze.com, printed Mar. 16, 2005, 13 pages.
Sattler, Michael, excerpts from Internet TV with CU-SeeMe, First Edition, including inside Title Page and Copyright Page; "Overview"; "Contents," through pp. xii; Chapter 1, "Introduction to Internet Videoconferencing and CU-SeeMe," pp. 1-12; Chapter 4, "Hardware," pp. 47-64; Chapter 5, "Software," pp. 65-92; Chapter 6, "CU-SeeMe Users Guide," pp. 93-121; Chapter 9, "Other Videoconferencing Technologies," pp. 201-226; Chapter 10, "What the Future Holds," pp. 227-233; Appendix A, "Troubleshooting Q&A," pp. 235-249; published by Sams.net Publishing, 201 W. 103rd St., Indianapolis, IN 46290, International Standard Book No. 1-57521-006-1, Library of Congress Catalog Card No. 95-70178, copyright © 1995.

Takashi Yoshino et al., "Namba: Location-Aware Collaboration System for Shopping and Meeting", Aug. 2002, IEEE Transactions on Consumer Electronics, pp. 470-477.
The LP Wireless Messenger, Messenger Documentation, [online]. LP Wireless, Inc., 2001 [retrieved on Nov. 2, 2002]. Retrieved from the Internet <http://www.lpwireless.com/messengerhelp.htm>, pp. 1-7.
Tribal Voice, PowWow Guided Tour—Step 6, Pow Wow personal communication. http://web.archive.org/web2000817094516/www.tribal.com/powwow/tour/step6.cfm, Oct. 22, 1999 (1 page).
USPTO, Final Office Action of May 18, 2006, U.S. Appl. No. 10/134,437 (26 pages).
USPTO, Final Office Action of Oct. 19, 2009, U.S. Appl. No. 10/015,424 (59 pages).
USPTO, Final Office Action of Oct. 30, 2009, U.S. Appl. No. 11/237,718 (21 pages).
USPTO, Office Action of Apr. 20, 2006, U.S. Appl. No. 10/184,002 (15 pages).
USPTO, Office Action of Aug. 25, 2005, U.S. Appl. No. 10/184,002 (13 pages).
VisiblePath webpages, www.visiblepath.org, Dec. 3, 2003, available at http://web.archive.org/web/20031203132211/http://www.visiblepath.com. printed Mar. 16, 2005, 5 pages.
Wayner, Peter, "Hey Baby, Call Me at My IP Address", Apr. 1996, pp. 142-144.
WBWE (1998), PowWow 3.6 Brings the Power of Internet Community to the People, Business Wire.
WebmasterWorld.com Inc., "HTML and Browsers", Mar. 5, 2001, Internet: www.webmasterworld.com/forum21/367.htm.
William R. Stanek, Microsoft Windows 2000 Administrator's Pocket Consultant [online]. Microsoft Corporation, 1999 [retrieved on May 8, 2003]. Retrieved from the Internet <http://www.microsoft.-com/technet/prodtechnol/ad/windows2000/evaluate/05w2kada.asp?fr...>, pp. 1-6.
Wingfield, N., "Technology Journal: Changing Chat—Instant Messaging Is Taking Off, and for some Users It's Nuzzling Out the Phone", Asian Wall Street Journal, New York, NY, Sep. 25, 2000, 5 pages.
Yubing Wang, Mark Claypool, Zheng Zuo. Video: An empirical study of realvideo performance across the internet. Proceedings of the $1^{st}$ ACM SIGCOMM Workshop on Internet Measurement IMW '01. Nov. 2001. ACM Press.
ZeroDegrees home page, www-zerodegrees.com, Jan. 24, 2004, available at http://web.archive.org/web/20040204153037/www.zerodegrees.com/home.htm, printed Mar. 16, 2005, 2 pages.

* cited by examiner

VIDEO MESSAGING

CROSS-REFERENCE TO RELATED APPLICATION(S)

This application is a continuation of U.S. patent application Ser. No. 09/911,799, filed Jul. 25, 2001 now U.S. Pat. No. 7,984,098, which claims the benefit of U.S. Provisional Application No. 60/220,648, filed Jul. 25, 2000, all of which are incorporated herein by reference.

TECHNICAL FIELD

The present invention relates generally to transferring electronic data between subscribers of a communications system and more particularly to transferring video instant messages between subscribers of an instant messaging host.

BACKGROUND

Online service providers offer new services and upgrade existing services to enhance their subscribers' online experience. Subscribers have on-demand access to news, weather, financial, sports, and entertainment services as well as the ability to transmit electronic messages and to participate in online discussion groups. For example, subscribers of online service providers such as America Online or CompuServe may view and retrieve information on a wide variety of topics from servers located throughout the world. A server may be maintained by the service provider or by a third party provider who makes information and services available through the worldwide network of computers that make up the online service.

America Online has provided subscribers with the ability to send and receive instant messages. Instant messages are private online conversations between two or more people who have subscribed to the instant messaging service and have installed the necessary software. Because such online conversations take place virtually in real time, instant messaging can provide immediate access to desired information. Instant messaging is becoming a preferred means of communicating among online subscribers.

SUMMARY

In one general aspect, electronic data is transferred between users of a communications system by enabling instant messaging communication between a sender and at least one recipient through an instant messaging host. In addition, video communication is enabled between the sender and the recipient through the instant messaging host.

Implementations may include one or more of the following features. For example, implementations may include receiving and authenticating a text instant message from the sender at the instant messaging host; determining capabilities of the recipient; reporting the capabilities of the recipient; receiving a request to establish video communication from the sender and/or the recipient; and/or authenticating the request. Authenticating may include identifying a screen name and/or an IP address of the sender and/or the recipient. Determining capabilities of the recipient may include identifying hardware or software associated with the recipient. A user interface may be displayed according to the capabilities of the recipient.

Video communication may be enabled by establishing a generic signaling interface channel, a control channel, and an audio channel between the sender and the recipient. The control channel may include a TCP/IP socket. The audio channel may include a UDP or TCP channel.

These and other general aspects may be implemented by an apparatus and/or by a computer program stored on a computer readable medium. The computer readable medium may comprise a disc, a client device, a host device, and/or a propagated signal.

Other features and advantages will be apparent from the following description, including the drawings, and from the claims.

DETAILED DESCRIPTION

For illustrative purposes, FIGS. 1-5 show aspects of a communications system for transferring electronic data between a client and a host. For brevity, several elements in the figures are represented as monolithic entities. Such elements, however, may represent numerous interconnected computer systems and/or components. An addressing scheme such as, for example, Uniform Resource Locators ("URLs") may be used to define the location and type of each element and/or component of the communications system.

The terms "client" and "host" generally refer to a role as a requester of data (client) or a provider of data (host). For example, data requested by a client may be transferred directly or indirectly from a host through a network and, finally, to the client. Elements of the communications system, however, may request data in one transaction and provide data in another transaction, thus having dual and/or changing roles.

Figure 1:
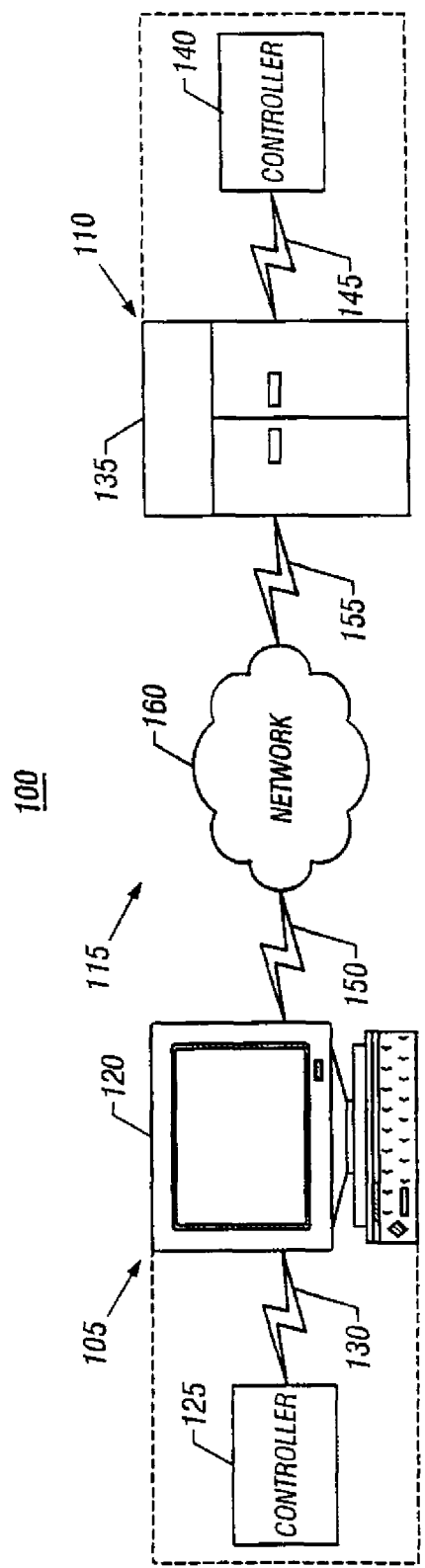
FIG. 1 is a block diagram of a communications system.

Referring to FIG. 1, a communications system 100 is capable of delivering and exchanging data between a client system 105 and a host system 110 through a communications link 115. The client system 105 may include one or more client devices 120 and/or client controllers 125, and the host system 110 may include one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more local area networks ("LANs") and/or one or more wide area networks ("WANs"). The client device 120, the client controller 125, the host device 135, and the host controller 140 each may include one or more hardware components and/or software components.

In general, a device (e.g., client device 120 and/or host device 135) executes instructions under the command of a controller (e.g., client controller 125 and/or host controller 140) and is connected to such controller by a wired and/or wireless data pathway (e.g., pathway 130 and/or pathway 145) capable of delivering data. An example of a device (e.g., client device 120 and/or host device 135) is a general-purpose computer (e.g., a personal computer, server) capable of responding to and executing instructions in a defined manner. Other examples include a special-purpose computer, a workstation, a component, other physical or virtual equipment and/or some combination thereof capable of responding to and executing instructions and/or capable of peer-to-peer communications.

An example of a controller (e.g., client controller 125 and/or host controller 140) is a software application for commanding and directing communications. Other examples include a program, a piece of code, an instruction, a computer, a computer system, and/or a combination thereof, for independently or collectively instructing a device (e.g., client device 120 and/or host device 135) to interact and operate as described. A controller (e.g., client controller 125 and/or host controller 140) may be embodied permanently or temporarily in any type of machine, component, physical or virtual equipment, storage medium, or propagated signal capable of providing instructions to a device (e.g., client device and/or host device 135).

The communications link 115 may include a delivery network 160 for directly or indirectly connecting the client system 105 and the host system 110, irrespective of physical separation. The delivery network 160 may include one or more interconnected networks such as, for example, the Internet, the World Wide Web ("Web"), a WAN, a LAN, an analog and/or a digital wired or wireless telephone network (e.g., PSTN, ISDN, and xDSL), a radio network, a television network, a cable network, a satellite network, and/or any other delivery mechanism for carrying data. The delivery network 160 also may include several intermediate and/or routing devices, such as, for example, proxy servers, bridges, and routers. The communications link 115 may include one or more communication pathways (e.g., pathway 150 and/or pathway 155) that enable communications through the delivery network 160. Each communication pathway (e.g., pathway 150 and/or pathway 155) may include, for example, a wired, wireless, cable or satellite communication pathway.

Figure 2:
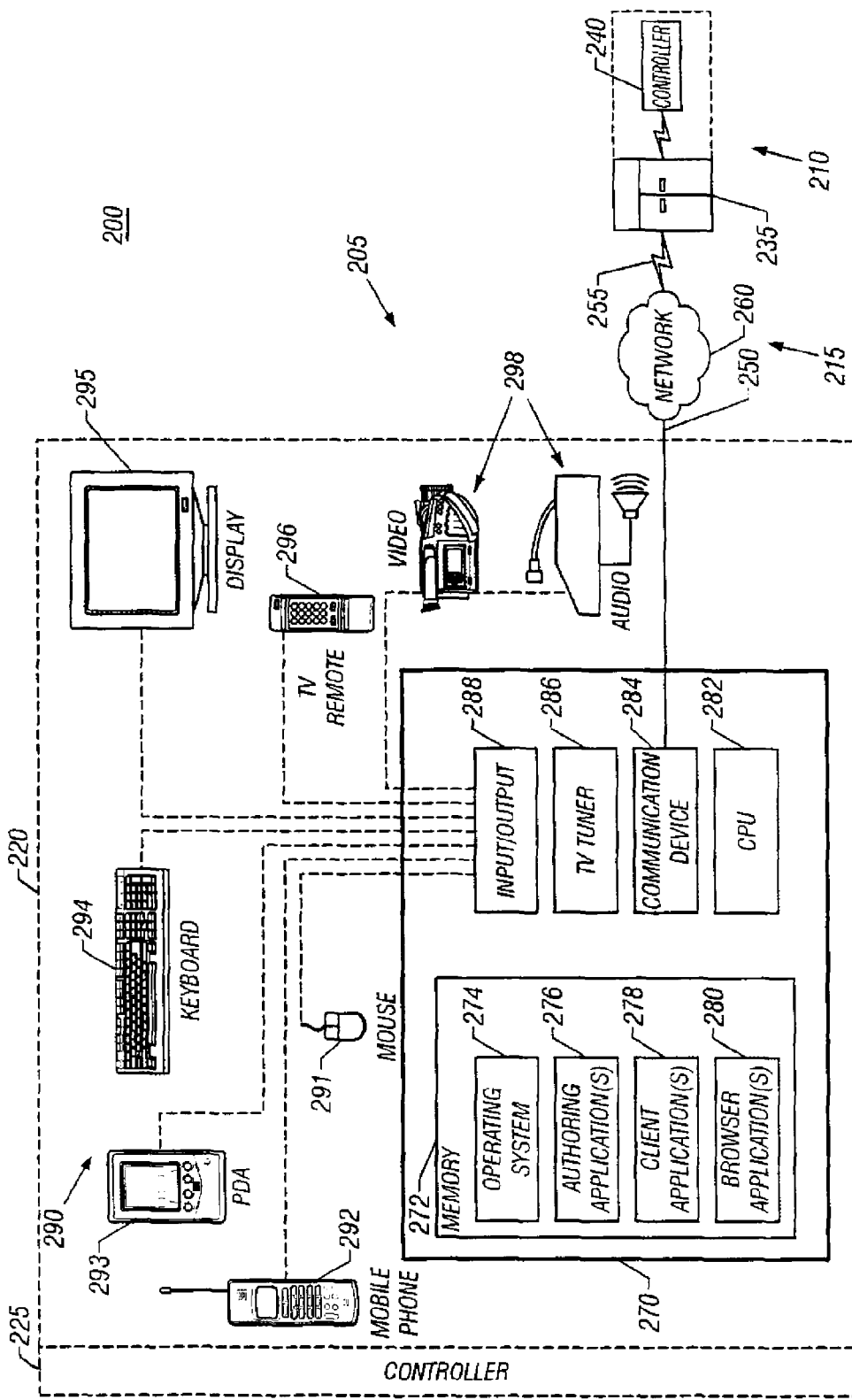
FIGS. 2-5 are block diagrams of expansions of aspects of the communications system of FIG. 1.

FIG. 2 illustrates a communications system 200 including a client system 205 communicating with a host system 210 through a communications link 215. The client system 205 may include one or more client devices 220 and one or more client controllers 225 for controlling the client devices 220. The host system 210 may include one or more host devices 235 and one or more host controllers 240 for controlling the host devices 235. The communications link 215 may include communication pathways 250, 255 enabling communications through the one or more delivery networks 260.

Examples of each element within the communications system of FIG. 2 are broadly described above with respect to FIG. 1. In particular, the host system 210 and communications link 215 may have attributes comparable to those described with respect to host system 110 and communications link 115 of FIG. 1. Likewise, the client system 205 of FIG. 2 may have attributes comparable to and illustrates one possible implementation of the client system 105 of FIG. 1.

In one implementation, the client device 220 includes a general-purpose computer 270 having an internal or external storage 272 for storing data and programs such as an operating system 274 (e.g., DOS, Windows™, Windows 95™, Windows 98™, Windows 2000™, Windows Me™, Windows XP™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator, Microsoft's Internet Explorer, Java's microbrowser) capable of rendering Internet content.

The general-purpose computer 270 also includes a central processing unit 282 ("CPU") for executing instructions in response to commands from the client controller 225. The client controller 225 may include one or more of the application programs installed on the internal or external storage 272 of the general-purpose computer 270. The client controller 225 also may include application programs externally stored in and performed by one or more device(s) external to the general-purpose computer 270.

The general-purpose computer 270 includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a television ("TV") tuner 286 for receiving TV programming in the form of a broadcast reception, satellite transmission, and/or cable signal. As a result, the client device 220 can selectively and/or simultaneously display network content received by communications device 284 and television programming content received by the TV tuner 286.

The general-purpose computer 270 also includes an input/output interface 288 for wired or wireless connection to various peripheral devices 290. Examples of peripheral devices 290 include, but are not limited to, a mouse 291, a mobile phone 292, a personal digital assistant 293 ("PDA"), an MP3 player (not shown), a keyboard 294, a display monitor 295 with or without a touch screen input, a TV remote control 296 for receiving information from and rendering information to subscribers, and an audiovisual input device 298 (e.g., Web cam, video camera, microphone, speakers).

Although FIG. 2 illustrates devices such as a mobile telephone 292, a PDA 293, an MP3 player (not shown), and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
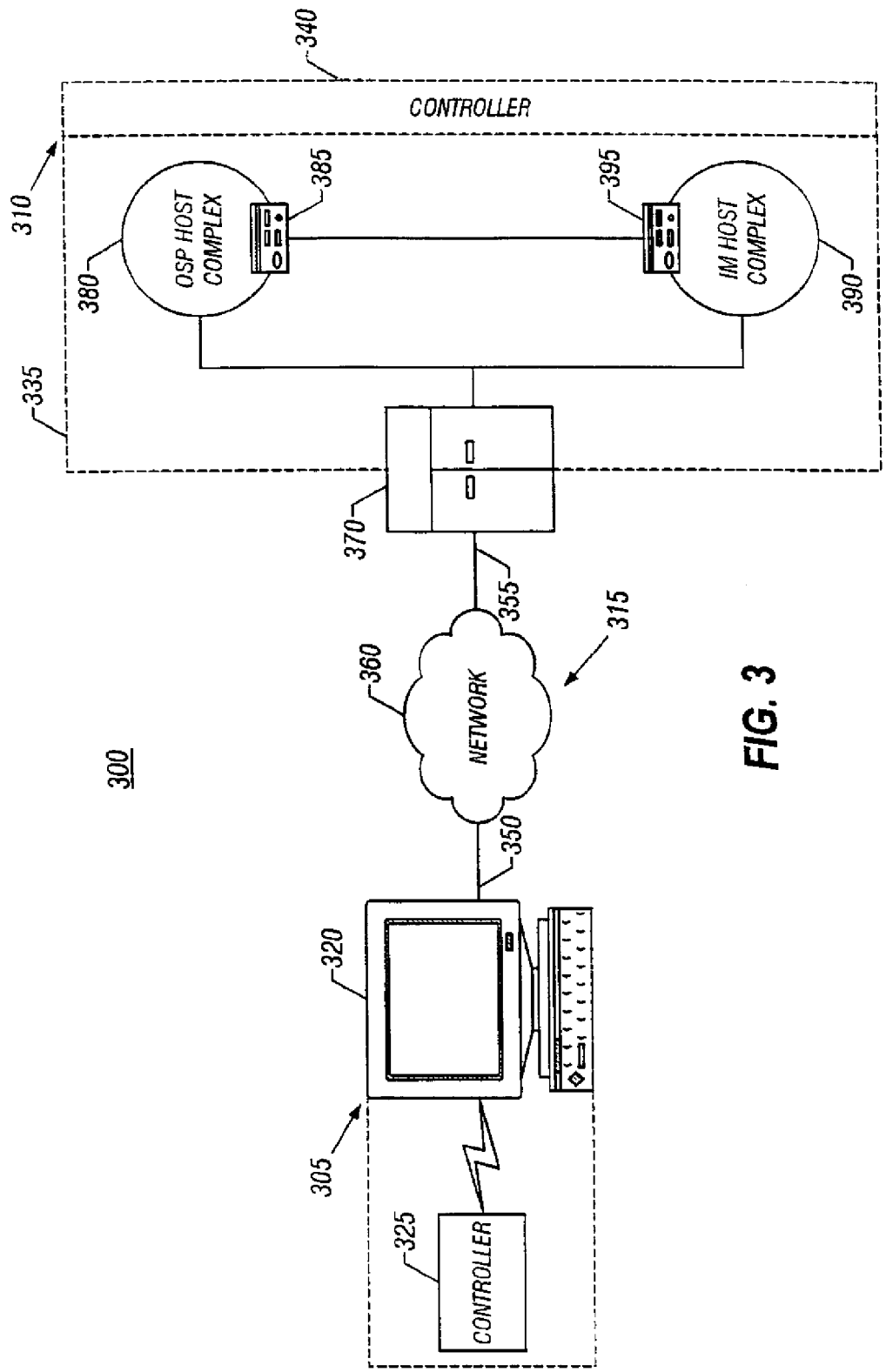

Referring to FIG. 3, a communications system 300 is capable of delivering and exchanging information between a client system 305 and a host system 310 through a communication link 315. The client system 305 may include one or more client devices 320 and one or more client controllers 325 for controlling the client devices 320. The host system 310 may include one or more host devices 335 and one or more host controllers 340 for controlling the host devices 335. The communications link 315 may include communication pathways 350, 355 enabling communications through the one or more delivery networks 360.

Examples of each element within the communications system of FIG. 3 are broadly described above with respect to FIGS. 1 and 2. In particular, the client system 305 and the communications link 315 may have attributes comparable to those described with respect to client systems 105 and 205 and communications links 115 and 215 of FIGS. 1 and 2. Likewise, the host system 310 of FIG. 3 may have attributes comparable to and illustrates one possible implementation of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. In other implementations, as described above, the host controller 340 may include any of several other programs, machines, and devices operating independently or collectively to control the host device 335.

The host device 335 includes a login server 370 for enabling access by subscribers and for routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. Examples of protocols include, but are not limited to hypertext transfer protocol ("HTTP"), user datagram protocol ("UDP"), and/or layer two tunneling protocol ("L2TP"). The OSP host complex 380 also may employ one or more proprietary OSP protocols and custom dialing engines to enable access by selected client applications. The OSP host complex 380 may define one or more specific protocols for each service based on an underlying protocol.

The IM host complex 390 may be independent of or included in the OSP host complex 380. The IM host complex 390 may support instant messaging services for OSP subscribers as well as for subscribers to other networks. Thus, the IM host complex 390 may enable instant messaging irrespective of an IM subscriber's Internet service provider. The IM host complex 390 also may support associated services, such as administrative support, advertising, directory services, chat, and interest groups related to the instant messaging. The IM host complex 390 has an architecture that enables all of the machines within the IM host complex 390 to communicate with each other. The IM host complex may employ one or more standard and/or proprietary protocols to transfer data.

The host device 335 may include one or more gateways (e.g., OSP host complex gateway 385 and/or IM host complex gateway 395) that connect and link complexes (e.g., the OSP host complex 380 and the IM host complex 390. Such gateways may directly or indirectly link host complexes through wired and/or wireless pathways. Ordinarily, when used to facilitate a link between complexes, a gateway (e.g., OSP host complex gateway 385 and/or IM host complex gateway 395) is privy to information regarding the protocol type anticipated by a destination complex, which enables any necessary protocol conversion to be performed incident to the transfer of data from one complex to another. For instance, the OSP host complex 380 and IM host complex 390 may use different protocols such that transferring data between the complexes requires protocol conversion by or at the request of a gateway (e.g., OSP host complex gateway 385 and/or the IM host complex gateway 395).

Figure 4:
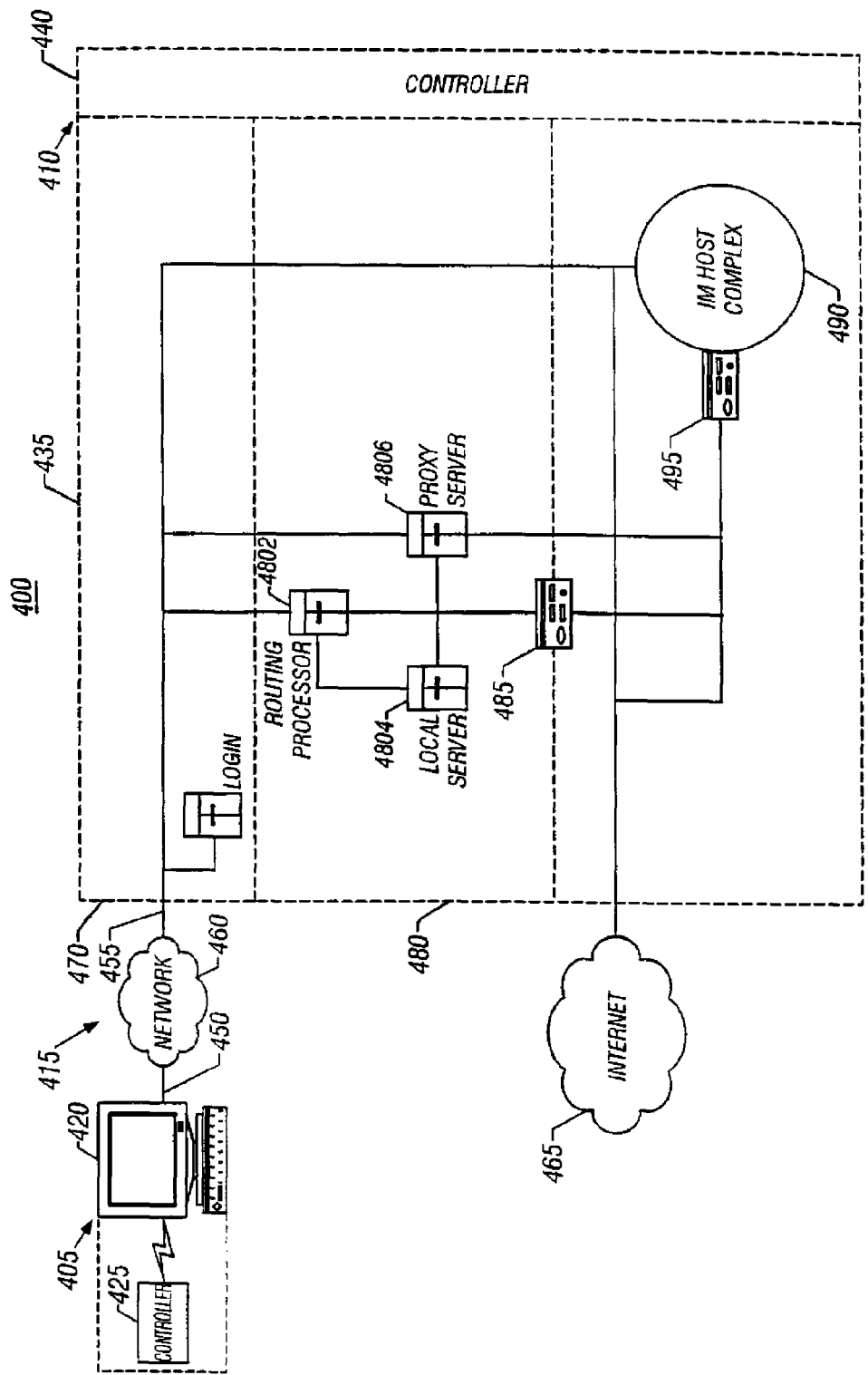

Referring to FIG. 4, a communications system 400 is capable of delivering and exchanging information between a client system 405 and a host system 410 through a communication link 415. The client system 405 may include one or more client devices 420 and one or more client controllers 425 for controlling the client devices 420. The host system 410 may include one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communications system of FIG. 4 are broadly described above with respect to FIGS. 1-3. In particular, the client system 405 and the communications link 415 may have attributes comparable to those described with respect to client systems 105, 205, and 305 and communications links 115, 215, and 315 of FIGS. 1-3. Likewise, the host system 410 of FIG. 4 may have attributes comparable to and illustrates one possible implementation of the host systems 110, 210, and 310 shown in FIGS. 1-3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. In general, the host controller 440 is capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communications between the OSP host complex 480, the IM host complex 490, and the Internet 465.

The OSP host complex 480 supports a set of services from one or more servers located internal to and external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In one implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4806 may include an IP ("Internet Protocol") tunnel for converting data from OSP protocol into standard Internet protocol and transmitting the data to the Internet 465. The IP tunnel also converts data received from the Internet 465 in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber may use an OSP TV client application having an embedded browser application installed on the client system 405 to generate a request in standard Internet protocol, such as HTTP. In a packet-based implementation, data packets may be encapsulated inside a standard Internet tunneling protocol, such as UDP, for example, and routed to the proxy server 4806. The proxy server 4806 also may include an L2TP tunnel capable of establishing a point-to-point protocol ("PPP") session with the client system 405.

The proxy server 4806 may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
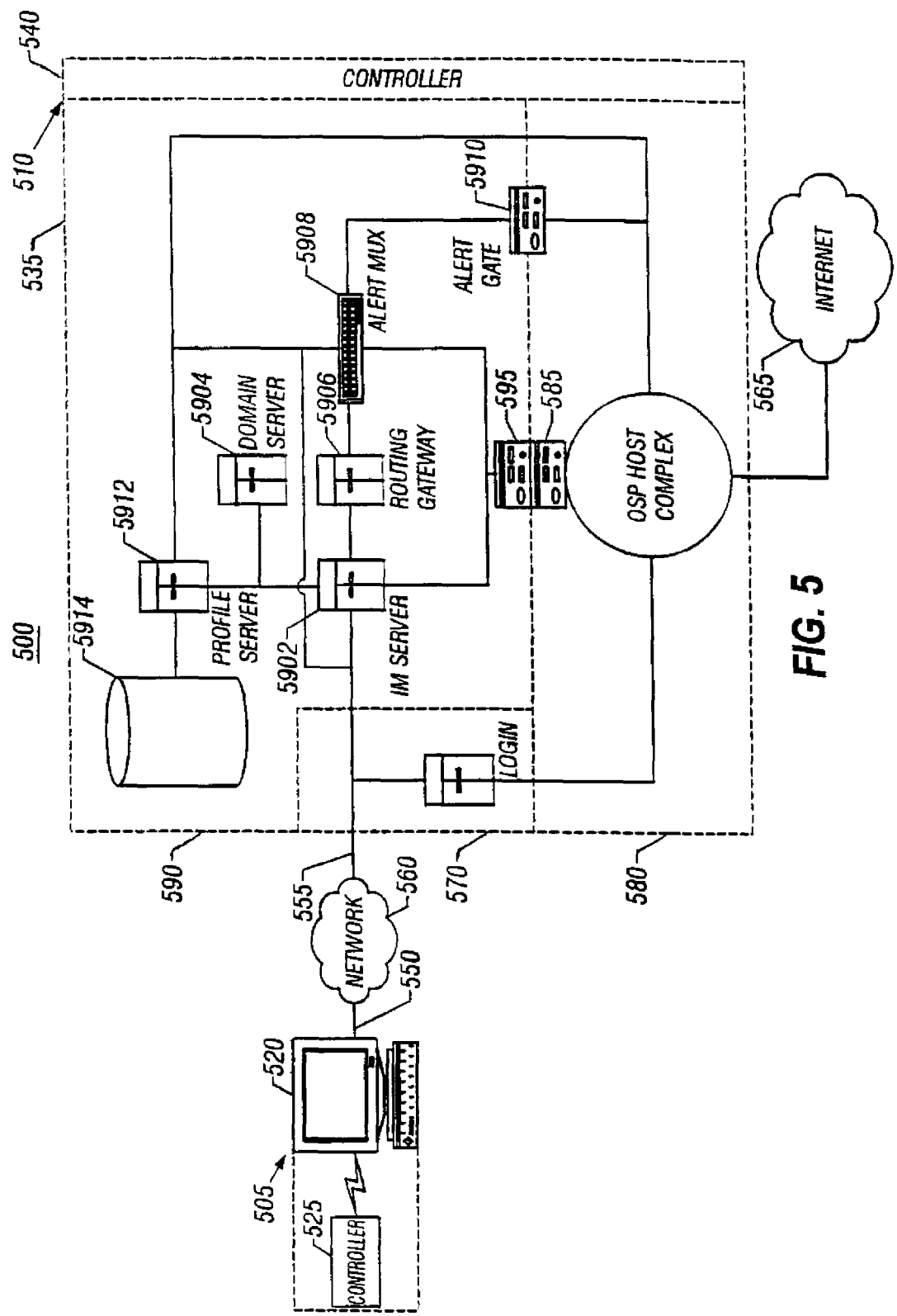

Referring to FIG. 5, a communications system 500 is capable of delivering and exchanging information between a client system 505 and a host system 510 through a communication link 515. The client system 505 may include one or more client devices 520 and one or more client controllers 525 for controlling the client devices 520. The host system 510 may include one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communications system of FIG. 5 are broadly described above with respect to FIGS. 1-4. In particular, the client system 505 and the communications link 515 may have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible implementation of the host systems 110, 210, 310, and 410 shown in FIGS. 1-4. FIG. 5 describes an aspect of the host system 510, focusing primarily on one particular implementation of the IM host complex 590.

The client system 505 includes a client device 520 and a client controller 525. In general, the client controller 525 is capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive (i.e., proprietary) IM protocols. The client controller 525 also may include applications, such as an OSP client application, and/or an Internet browser application for communicating with the OSP host complex 580 and the Internet 565, respectively.

The host system 510 includes a host device 535 and a host controller 540. In general, the host controller 540 is capable of transmitting instructions to any or all of the elements of the host device 535. For example, in one implementation, the host controller 540 includes one or more software applications loaded on one or more elements of the host device 535. However, in other implementations, as described above, the host controller 540 may include any of several other programs, machines, and devices operating independently or collectively to control the host device 535.

The host system 510 includes a login server 570 capable of enabling communications with and authorizing access by client systems 505 to various elements of the host system 510, including an OSP host complex 580 and an IM host complex 590. The login server 570 may implement one or more authorization procedures to enable simultaneous access to the OSP host complex 580 and the IM host complex 590. The OSP host complex 580 and the IM host complex 590 are connected through one or more OSP host complex gateways 585 and one or more IM host complex gateways 595. Each OSP host complex gateway 585 and IM host complex gateway 595 may perform any necessary protocol conversions to enable communication among the OSP host complex 580, the IM host complex 590, and/or the Internet 565.

In one implementation, to begin an instant messaging session, the client system 505 accesses the IM host complex 590 and establishes a connection to the login server 570. The login server 570 determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. The client system 505 may be equipped with a Winsock application programming interface ("API") that enables the client system 505 to establish an open transmission control protocol ("TCP") connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. In general, the purpose of the domain servers 5904 is to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the World Wide Web.

In the implementation of FIG. 5, the IM server 5902 is directly or indirectly connected to a routing gateway 5906. The routing gateway 5906 facilitates the connection between the IM server 5902 and one or more alert MUXs ("MUXs") 5908, for example, by serving as a link minimization tool or hub to connect several IM servers 5902 to several alert MUXs 5908. In general, an alert MUX 5908 maintains a record of alerts and subscribers registered to receive the alerts.

Once the client system 505 is connected to the alert MUX 5908, a subscriber can register for and/or receive one or more types of alerts. The connection pathway between the client system 505 and the alert MUX 5908 is determined by employing another hashing technique at the IM server 5902 to identify the particular alert MUX 5908 to be used for the subscriber's session. Once the particular MUX 5908 has been identified, the IM server 5902 provides the client system 505 with the IP address of the particular alert MUX 5908 and gives the client system 505 an encrypted key (i.e., a cookie). The client system 505 then uses the IP address to connect to the particular alert MUX 5908 through the communication link 515 and obtains access to the alert MUX 5908 using the encrypted key.

The alert MUX 5908 is connected to an alert gate 5910 that, like the IM host complex gateway 595, is capable of performing the necessary protocol conversions to form a bridge to the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. However, the alert MUX 5908 also may communicate with the OSP host complex 580 through the IM host complex gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (i.e., alert receive code) capable of interacting with another piece of code (i.e., alert broadcast code) on the physical server where a state change occurs. In general, the alert receive code installed on the alert gate 5910 instructs the alert broadcast code installed on the physical server to send a feed to the alert gate 5910 upon the occurrence of a particular state change. Upon detecting a feed, the alert gate 5910 contacts the alert MUX 5908, which in turn, informs the client system 505 of the detected feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, and geographic location. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new and/or different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert MUX 5908. The subscriber profile server 5912 also may communicate with other servers in the OSP host complex 580 to share subscriber profile data with other services. Alternatively, user profile data may be saved locally on the client device 505.

Figure 6:
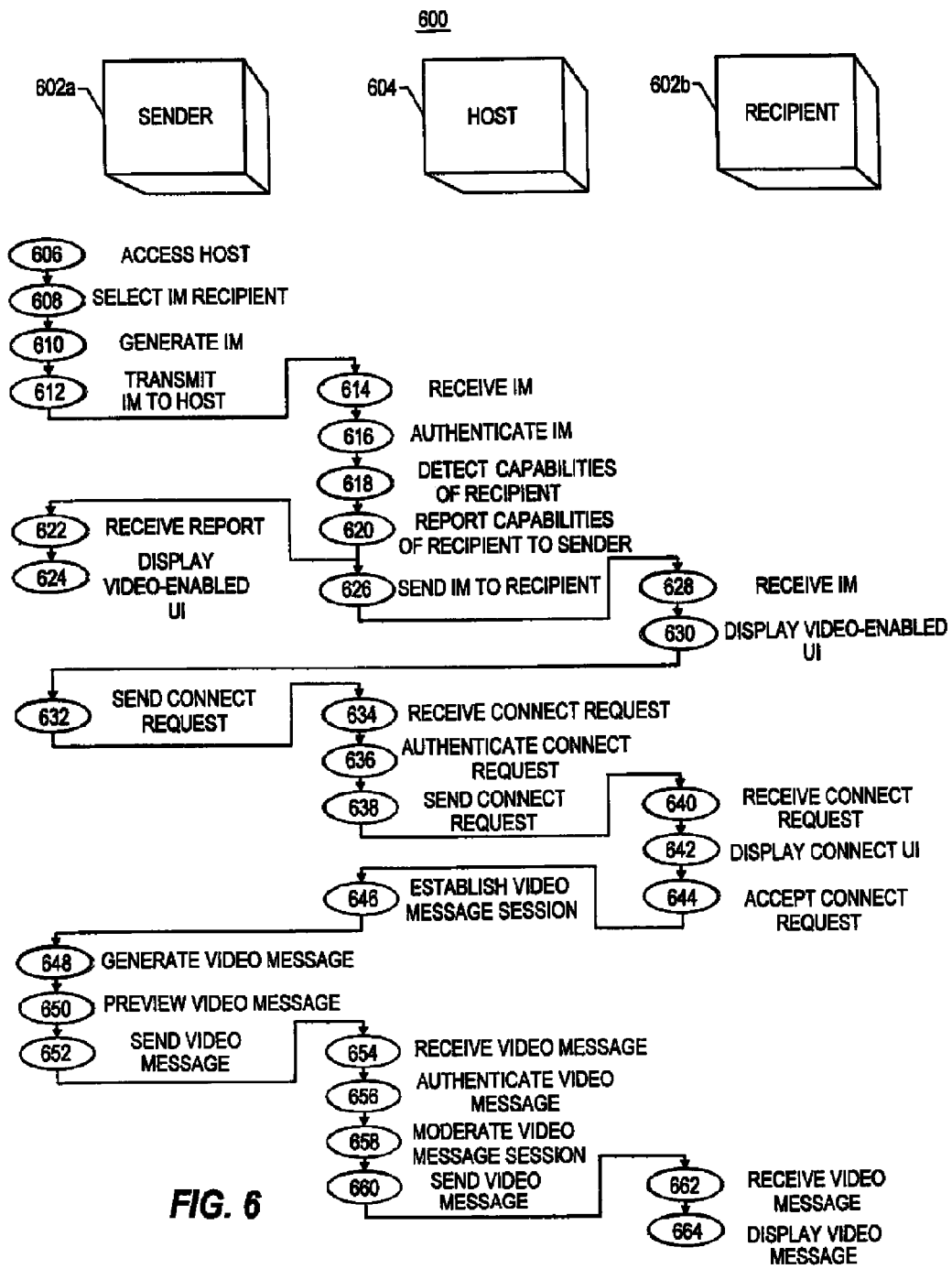
FIG. 6 is a flow chart of a communications method that may be implemented by the communications systems of FIGS. 1-5.

Referring to FIG. 6, a sender 602a, a recipient 602b, and a host 604 transfer video data according to a procedure 600. The procedure 600 may be implemented by any suitable type of hardware (e.g., device, computer, computer system, equipment, component); software (e.g., program, application, instructions, code); storage medium (e.g., disk, external memory, internal memory, propagated signal); or combination thereof.

Examples of each element of FIG. 6 are broadly described with respect to FIGS. 1-5 above. In particular, the sender 602a and the recipient 602b may have attributes comparable to those described with respect to client devices 120, 220, 320, 420, and 520 and/or client controllers 125, 225, 325, 425, and 525. The host 604 may have attributes comparable to those described with respect to host device 135, 235, 335, 435, and 535 and/or host controllers 140, 240, 340, 440, and 540. The sender 602a, the recipient 602b, and/or the host 604 may be directly or indirectly interconnected through a known or described delivery network.

In one implementation, the sender 602a is associated with a first subscriber and the recipient 602b is associated with a second subscriber, and each of the sender 602a and the recipient 602b include a client application for accessing the host 604. Each subscriber may use the client application to set individual preferences for allowing messages and/or files to be transferred to and from other subscribers. Typically, a graphical user interface ("UI") is displayed that allows each subscriber to select among various levels of security and/or to grant (or deny) access to others subscribers. A subscriber's transfer preferences may be maintained locally at the client or remotely at the host 604. In this example, the transfer preferences are set to allow messages and files to be transferred between the sender 602a and the recipient 602b.

In order to communicate using instant messaging, the sender 602a and the recipient 602b must be accessing the host 604 at the same time. To access the host 604, the sender 602a and the recipient 602b each send a separate request to the host 604. The request identifies the associated subscriber to the host 604 and to other subscribers using a unique screen name. The host 604 verifies a subscriber's information (e.g., screen name and password) against data stored in a subscriber database. If the subscriber's information is verified, the host 604 authorizes access. If the subscriber's information is not verified, the host 604 denies access and sends an error message.

After being authorized, the sender 602a and the recipient 602b can communicate over a direct (i.e., socket) connection established through the host 604. The sender 602a and the recipient 602b use the connection to communicate with the host 604 and with each other. The connection remains open during the time that the sender 602a and the recipient 602b are accessing the host 604. The sender 602a and the recipient 602b each may include a Winsock API for opening and establishing a TCP connection to the host 604.

Upon accessing the host 604, a "buddy list" is displayed to the subscriber. In general, a subscriber's buddy list is a user interface that lists the online status and capabilities of certain screen names, i.e., "buddies," identified by the subscriber. In particular, the host 604 informs the sender whether identified buddies are online, i.e., currently accessing the host 604. The host 604 also informs any subscriber who has identified the sender as a buddy that the sender is currently online. The buddy list also facilitates instant messaging communication between subscribers. A subscriber can activate an instant messaging message user interface pre-addressed to a buddy simply by clicking the screen name of a buddy on the buddy list. If a recipient is not a "buddy," the first subscriber must activate a blank instant messaging user interface and then address it to the screen name of the intended recipient. When necessary, a subscriber can look up the screen name of an intended recipient using the intended recipient's e-mail address. In addition to exchanging instant messages with online buddies, the sender may participate in group chat rooms, locate other subscribers with similar interests, get customized news and stock quotes, search the Web, and transfer files to and from other subscribers.

Video messaging (i.e., video-enabled instant messaging) further extends the functionality of instant messaging by allowing the sender 602a and the recipient 602b to communicate peer to peer using video, i.e., camera, microphone, and speaker. In the implementation of FIG. 6, a sender 602a, a recipient 602b, and a host 604 interact according to a procedure 600 to send and receive a video message (i.e., video instant message).

Initially, the sender 602a accesses the host 604 (step 606). In one implementation, the sender 602a is a subscriber and/or a client (e.g., client system 505) and the host 604 includes one or more host complexes (e.g., OSP host complex 580 and/or IM host complex 590) for providing instant messaging capability and coordinating the transfer of electronic data between subscribers. The sender 602a may access the host 604 using any available device (e.g., computer, PC, laptop, appliance, pager, PDA, interactive TV, telephone) and/or a controller (e.g., software program, client application, browser application).

The sender 602a designates at least one recipient 602b to receive an instant message (step 608), generates an instant message (step 610) and then transmits the instant message to the host 604 (step 612). The instant message may be, for example, a text instant message or other non-video instant message (e.g., voice message) created by the sender 602a. The recipient 602b may be a subscriber and/or client (e.g., client system 505) capable of accessing the host 604 using a device (e.g., computer, PC, laptop, appliance, pager, PDA, interactive TV, telephone) and/or a controller (e.g., software program, client application, browser application). In one implementation, a screen name associated with the intended recipient 602b has been identified as a "buddy" of the sender 602a, and a UI (e.g., buddy list) indicating the online status and capabilities of the recipient 602b is displayed to the sender 602a. Thus, the sender 602a can confirm that the recipient is able to communicate (i.e., is online) and then open an IM box by selecting (e.g., clicking) the screen name associated with the recipient 602b. After composing an instant message and clicking a Send button, the sender 602a transmits the instant message to the host 604 (step 612).

The host 604 receives the instant message from the sender 602a (step 614) and then authenticates the instant message (step 616). In one implementation, the instant message includes header information identifying the message type, the screen name and/or IP address of the sender 602a and the recipient 602b, and a randomly generated security number. A server (e.g., IM server 5902) on the host 604 may authenticate the instant message by matching the screen names and/or IP addresses with those of valid subscribers stored in a reverse look-up table. In the event that either the sender 602a or recipient 602b is not associated with a valid subscriber, the host 604 reports an error message.

After authenticating the instant message (step 616), the host 604 detects the capabilities of the recipient (step 618) and reports the capabilities of the recipient 602b to the sender 602a (step 620). In one implementation, a network of servers (e.g., IM servers 5902) on the host 604 monitors and updates the online status, client version, and device type of connected subscribers in real time. The capability to use video messaging (i.e., to receive a video instant message) may depend on factors such as a subscriber's hardware (e.g., device type), software (e.g., client version), and/or transfer preferences (e.g., blocked screen names). In general, to be video-enabled, the necessary software (e.g., video-enabled IM client application) and video equipment (e.g., audiovisual input device 298) must be available to the sender 602a and the recipient 602b.

Figure 7:
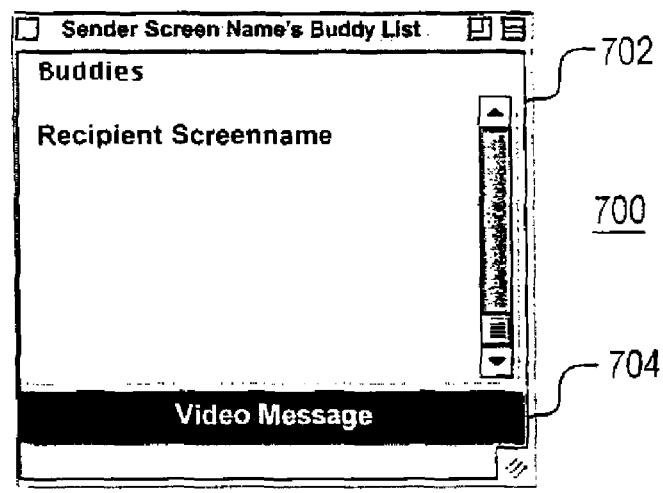
FIGS. 7-13 are illustrations of different graphical user interfaces that may be presented by the communications systems of FIGS. 1-5.

Next, the sender 602a receives the report from the host 604 (step 622) and displays a UI corresponding to the capabilities of the sender 602a and/or the recipient 602b (step 624). In general, if the sender 602a (e.g., client system 505) is not video-enabled, the sender 602a displays a standard instant messaging UI. If the sender 602a is video-enabled, then the sender 602a displays a video-enabled UI. In one implementation, shown in FIG. 7, a Video Messaging Buddy List UI 700 includes a buddy list 702 and a Video Message button 704 for instructing the host 604 to request a video message connection when clicked. The UI 700 also may include other buttons (not shown) corresponding to additional capabilities (e.g., voice IM) of the sender 602a and/or the recipient 602b.

Figure 8:
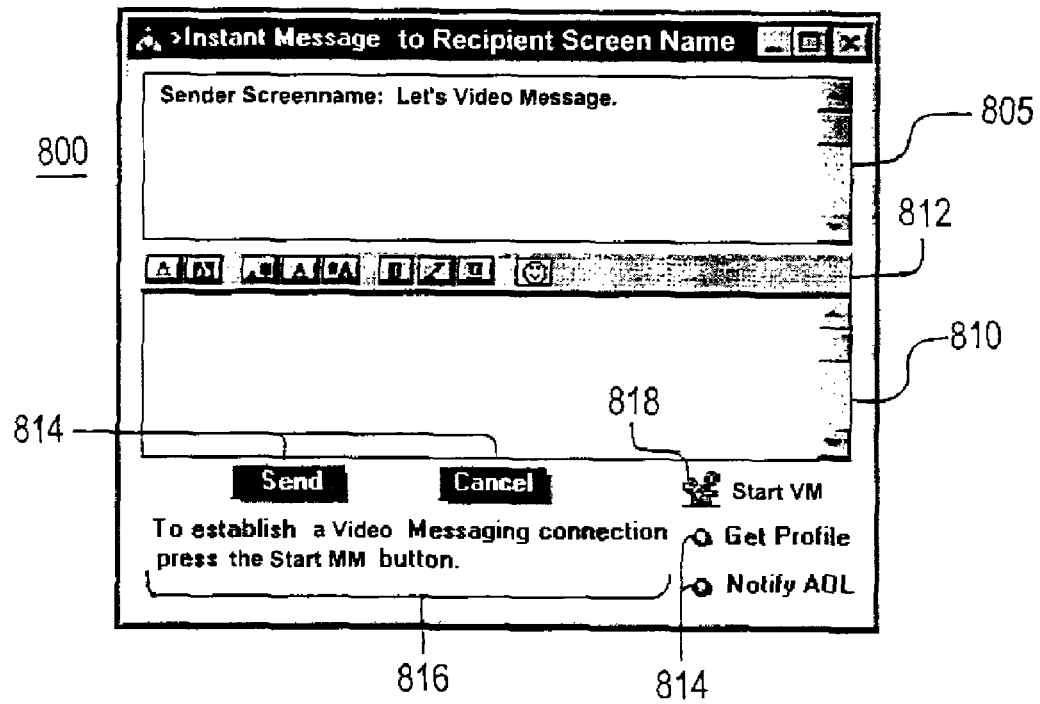

In another implementation, shown in FIG. 8, a Start Video Message UI 800 includes an IM window 805 for displaying a running transcript of an IM session, a text message area 810 for entering the text of an instant message, and an IM toolbar 812 for changing text or background colors, changing text size, emphasizing text (e.g., bold, italic, or underlining), and inserting objects (e.g., emoticons, hyperlinks, images). The Start Video Message UI 800 also includes IM buttons 814 for performing IM functions such as sending instant messages, canceling an instant message or IM session, getting the profile of a sender, and notifying the OSP of offending conduct. In addition, the Start Video Message UI 800 includes a notification 816 and a Start VM (Video Message) button 818 for instructing the host 604 to request a video message connection when clicked.

After reporting the capabilities of the recipient 602b to the sender 602a (step 620) or at any time after authenticating the instant message (step 616), the host 604 sends the instant message to the recipient 602b (step 626). The recipient 602b accepts the instant message from the host 604 (step 628) and displays a UI corresponding to the capabilities of the sender 602a and/or the recipient 602b (step 630). In general, if the recipient 602b is not video-enabled, then the recipient 602b displays a standard instant messaging UI. If the recipient 602b is video-enabled, the recipient 602b displays a video messaging UI (e.g., UI 700, UI 800).

In the event both the sender 602a and the recipient 602b are video-enabled, either can initiate a video message session. In the implementation of FIG. 6, the sender 602a initiates a video message session by sending a connect request to the host 604 (step 632). The connect request may contain information including, but not limited to, the message type, the screen name and/or IP address of the sender 602a and recipient 602b, and a randomly generated security number. The connect request may be created and sent automatically by clicking the Video Message button 710 of the UI 700 and/or the Start VM button 818 of the UI 800, for example.

The host 604 receives the connect request from the sender 602a (step 634), authenticates the connect request from the sender 602a (step 636), and then sends the connect request to the recipient 602b (step 638). The host 604 may authenticate the video request, for example, by using a reverse look-up table to match the screen names and/or IP addresses with those of valid subscribers. In the event that either the sender 602a or recipient 602b is not associated with a valid subscriber, the host 604 reports an error message.

Figure 9:
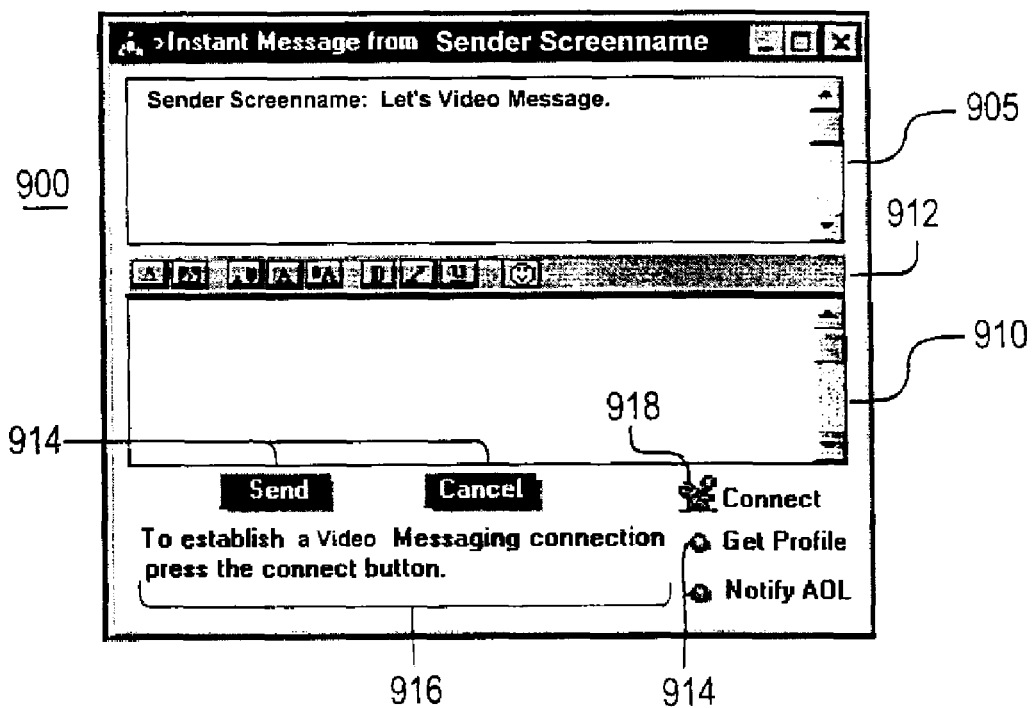

The recipient 602b receives the connect request (step 640) and then displays a UI informing the recipient 602b that the sender 602a wants to engage in a video message session (step 642). In one implementation, shown in FIG. 9, a Connect UI 900 includes an IM window 905 for displaying a running transcript of an IM session, a text message area 910 for entering the text of an instant message, and an IM toolbar 912 for changing text or background colors, changing text size, emphasizing text (e.g., bold, italic, or underlining), and inserting objects (e.g., emoticons, hyperlinks, images). The Connect UI 900 also includes IM buttons 914 for performing IM functions such as sending instant messages, canceling an instant message or IM session, getting the profile of a sender, and notifying the OSP of offending conduct. In addition, the Connect UI 900 includes a notification 916 and a connect button 918 for authorizing the host 604 to establish a video message connection when clicked.

When presented with the connect request, the recipient 602b may ignore the connect request, accept the connect request, or cancel the instant message session. If the recipient 602b accepts the connect request (step 644), for example, by clicking the connect button 818, the host 604 establishes a video message session (step 646) that allows the sender 602a to communicate with the recipient 602b using video messaging.

Figure 10A:
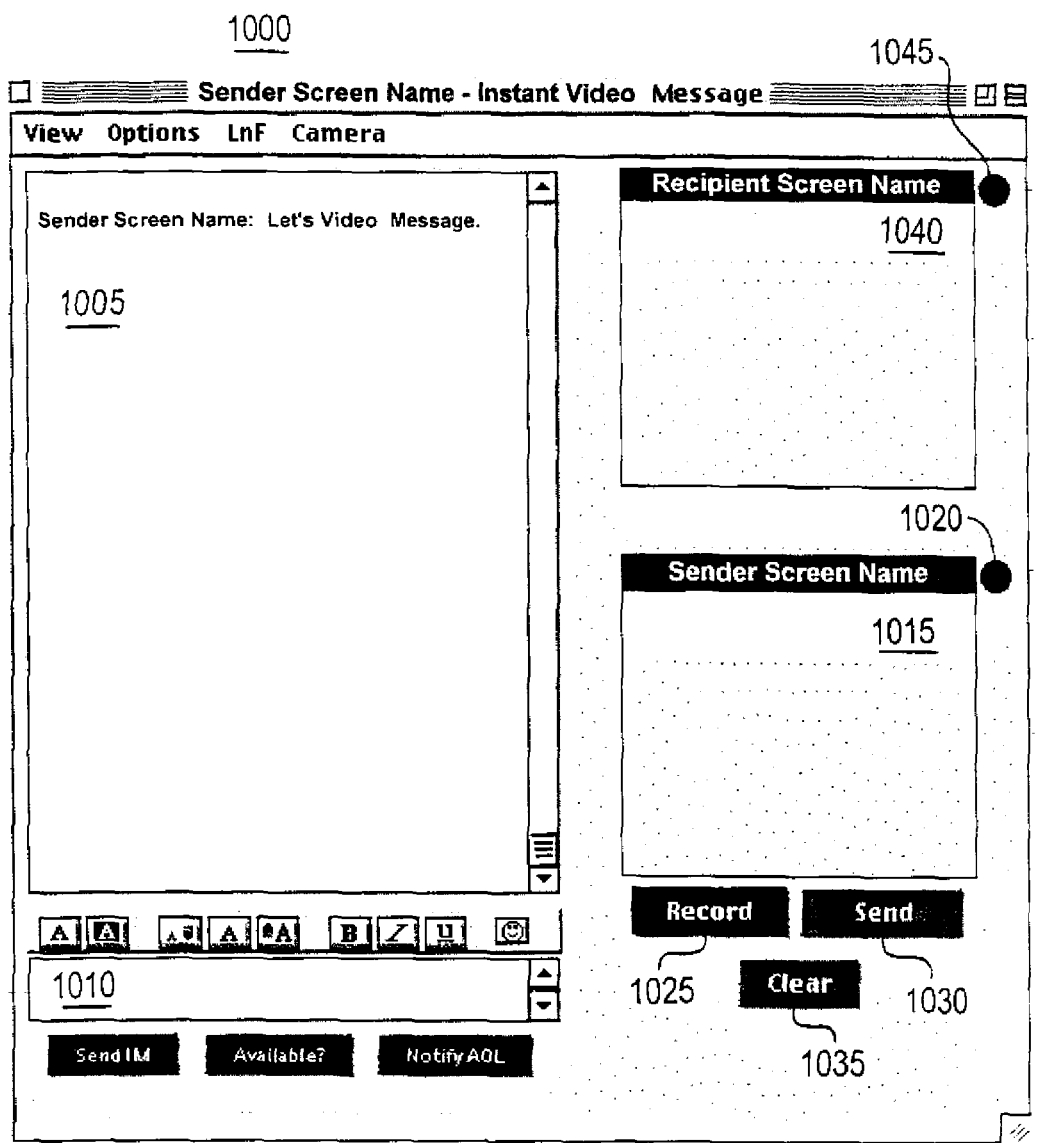

After the host 604 establishes a video message session (step 646), the sender 602a generates a video message (step 648). In one implementation, shown in FIG. 10A, the sender 602a is presented with an Instant Video Message UI 1000. The Instant Video Message UI 1000 includes an IM window 1005 for displaying a running transcript of an IM session and a text message area 1010 for entering the text of an instant message. The Instant Video Message UI 1000 also includes a send video message window 1015 for recording, previewing, and/or sending a video message, a transfer indicator 1020 for indicating the transfer of data from the sender 602a, a Record button 1025 to start recording a video message, a Send button 1030 to send a recorded video message, and Clear button 1035 to delete a recorded video message. A screen name associated with the sender 602a is displayed at the top of the send video message window 1015. The Instant Video Message UI 1000 additionally includes a receive move message window 1040 for viewing a received video message and a transfer indicator 1045 for indicating the transfer of data to the sender 602b. A screen name associated with the recipient 602b is displayed at the top of the receive video message window 1040.

Figure 10B:
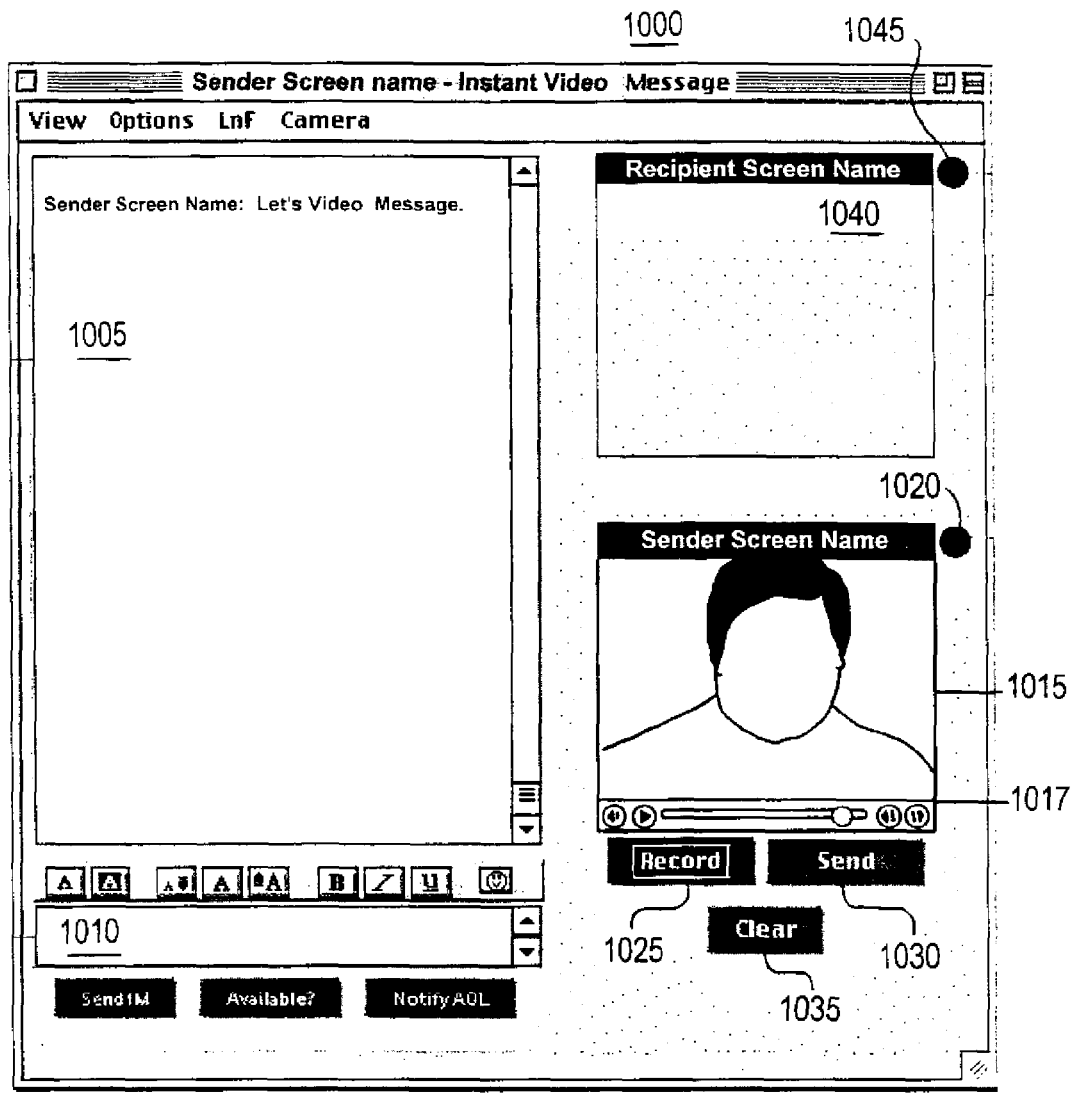

Referring to FIG. 10B, a subscriber associated with the sender 602a (e.g., computer system running a video-enabled instant messaging client) may generate a video message (step 648) by clicking the Record button 1025 and speaking a message into video recording equipment such as, for example, a video camera with a speaker or other recording device (e.g., audiovisual device 298) capable of capturing sight and sound. In one implementation, there are recording restrictions (e.g., time, size, number) for video messages placed on the sender 602a. The sender 602a (e.g., IM client application) and/or the host 604 (e.g., IM 5902) may impose and/or enforce the recording restrictions. For example, the sender may not be able to record a video message longer than 15 seconds. The client 602a may be configured, however, to automatically send a video message when the limit is reached and to begin recording another video message without user intervention.

After recording is complete, the subscriber can preview the generated video message (step 650). In one implementation, the subscriber uses a display toolbar 1017 to play, rewind, fast-forward, and/or otherwise view the recorded video message. If desired, the subscriber can delete the recorded video message by clicking the clear button 1035 and record a new video message.

Figure 10C:
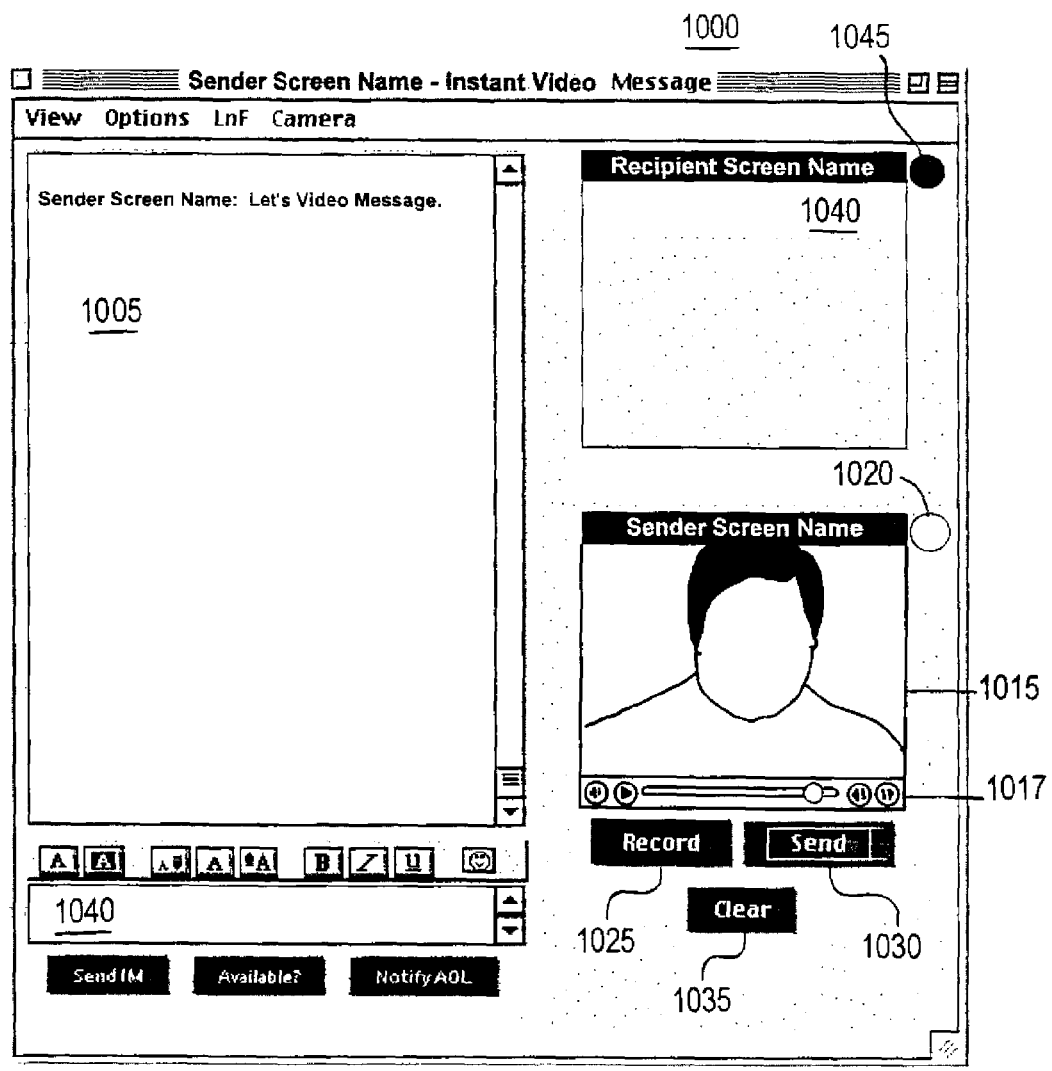

Referring to FIG. 10C, after determining that a recorded video message is acceptable, for example, by previewing (step 650), the subscriber and/or sender 602a can send the video message (step 652). In one implementation, the subscriber clicks the Send button 1030, which initiates the transfer of the video message to the recipient 602b. The transfer indicator 1020 may change colors to indicate that video message data is being transmitted.

Figure 10D:
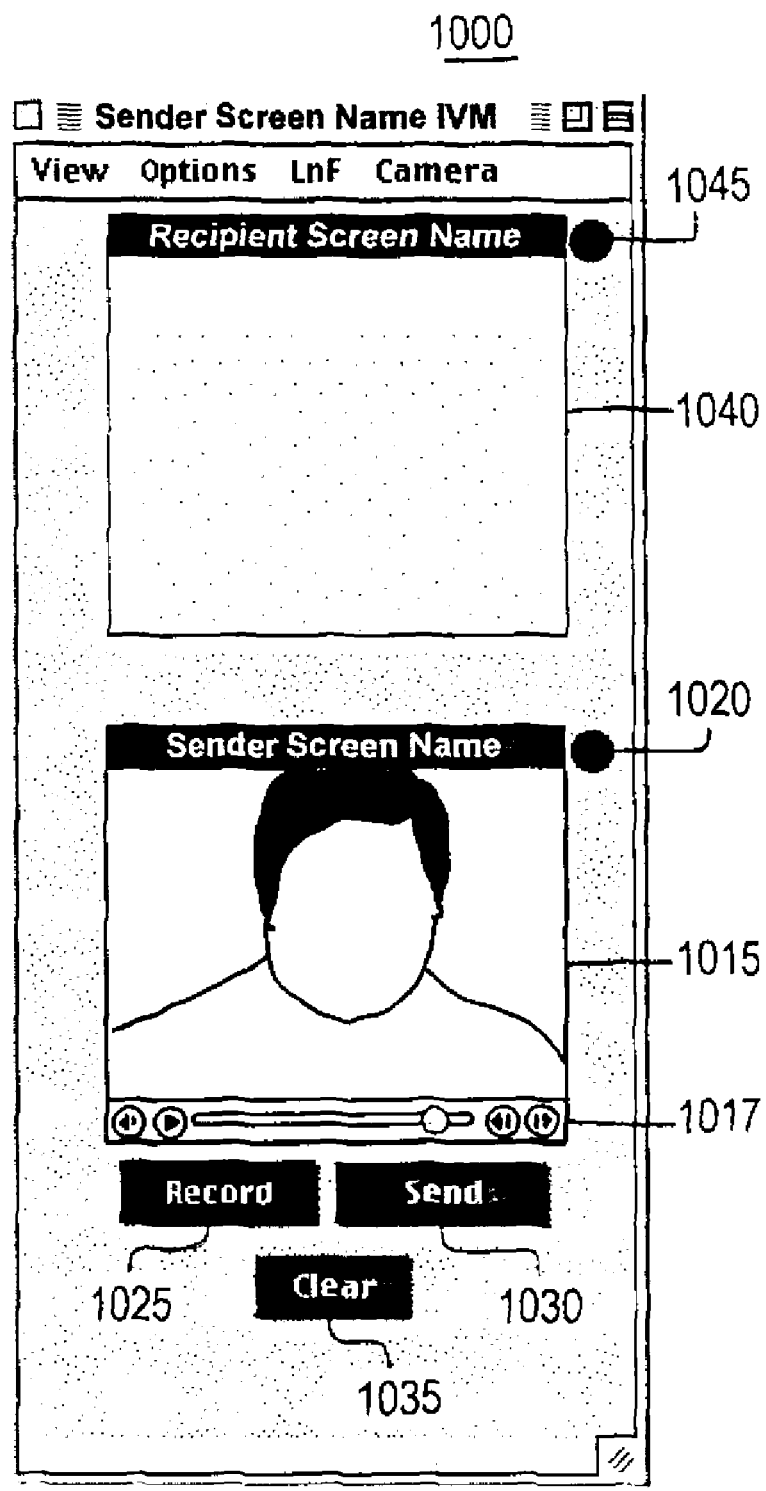

Referring to FIG. 10D, in one implementation, the Instant Video Message UI 1000 includes only the send video message window 1015, the transfer indicator 1020, the Record button 1025, the Send button 1030, the Clear button 1035, the receive move message window 1040, and the transfer indicator 1045 to save screen real estate. This implementation may be especially attractive to a subscriber who does not like to type.

The host 604 receives the video message from the client 602a (step 654). In one implementation, a server (e.g., IM server 5902, Domain Server 5904) on the host 604 is configured to receive video messages. The host 604 (e.g., IM server 5902, Domain Server 5904) then authenticates the video message from the sender 602a (step 656). The host 604 may authenticate the video message, for example, by using a reverse look-up table to match the screen names and/or IP addresses associated with the sender 602a and/or recipient 602b to those of valid subscribers. In the event that either the sender 602a or recipient 602b is not associated with a valid subscriber, the host 604 reports an error message.

Next, the host 604 moderates the video message session (step 658). In one implementation, a server (e.g., IM server 5902, Domain Server 5904) on the host 604 is configured to moderate a video message session between at least one sender 602a and at least one recipient 602b. Moderating may include managing load conditions of the host 604 by compressing, decompressing, caching, and/or allocating resources to efficiently store and forward video messages. Moderating also may include sampling and filtering video messages based on the capabilities and/or preferences of a recipient 602b. For example, the host 604 may sample a video message to determine viewing requirements and/or content of the video message. If the host 604 determines that the intended recipient 602b is not capable of or does not wish to view a particular video message, the host 604 may discard, modify, and/or otherwise filter the video message.

Moderating the video message session may include controlling the ability of at least one recipient 602b to view a video message. For example, the host 604 may structure the video message session such that one or more recipients view the video message simultaneously. This type of control may be useful in a lecture setting in which one sender 602a is responsible for a majority of the video messages. Moderating also may include controlling the ability of at least one sender 602a to transmit a video message. For example, when several senders are participating in a video message, the host 604 may limit the ability to transmit a video message only to one sender at a time. This type of control may be useful in a conference setting in which many senders are transmitting video messages.

Moderating the video message session also may include logging and/or storing video messages in a queue as they are received. If video messages are received from several senders, the host 604 may queue the video messages according to arrival, according to sender, according to topic, according to relevance, and/or according to any other ranking criteria. Video messages in the queue may be ordered, deleted, edited, and/or otherwise managed by the host 604.

Figure 11:
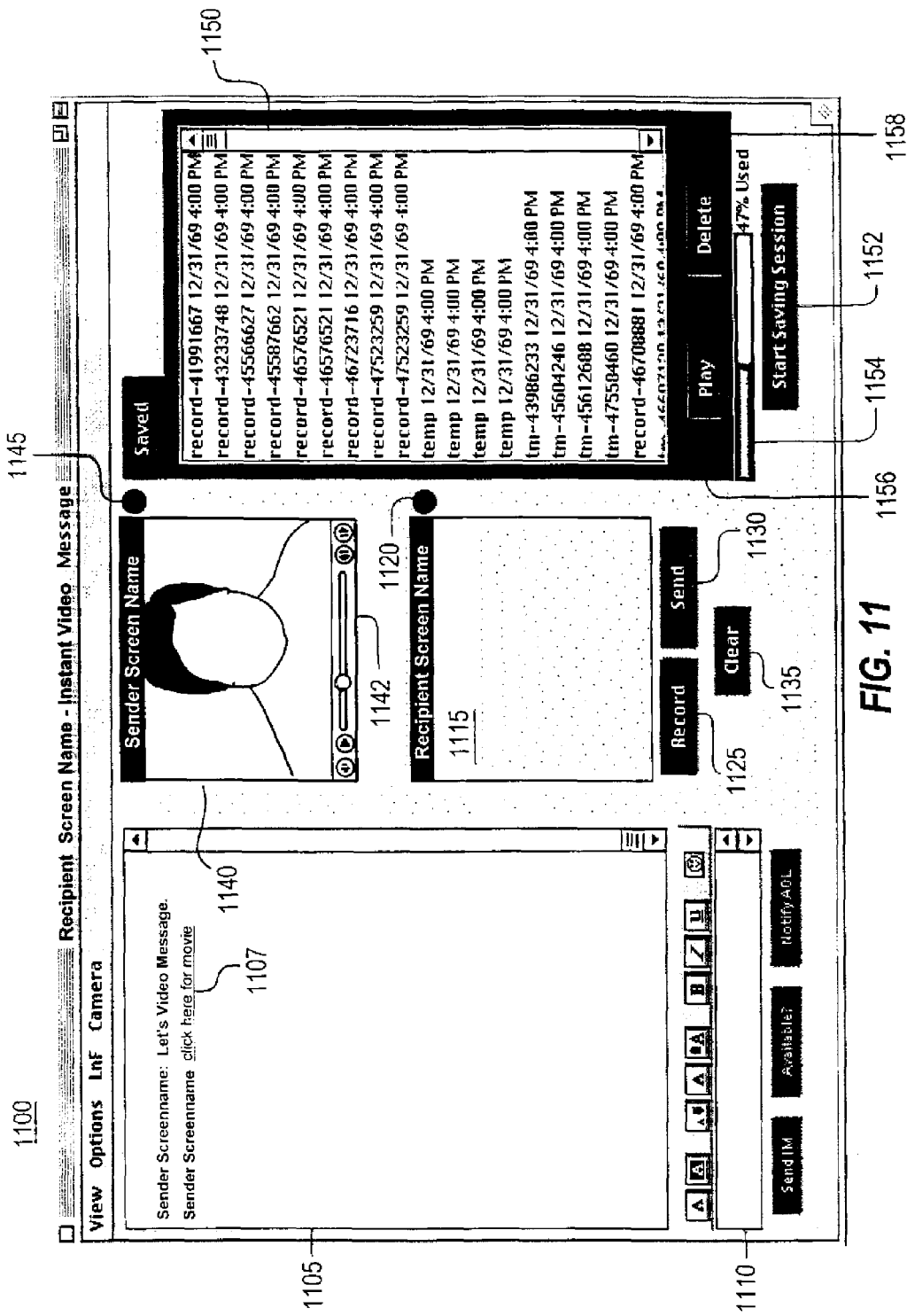

The host 604 also may allow the video message in the queue to be managed by at least one sender 602a and/or by at least one recipient 602b. In the implementation shown in FIG. 11, the recipient 602b displays a Instant Video Message UI 1100 including a video message session window 1150, a Start Saving Session button 1152, a storage capacity bar 1154, a Play button 1156, and a Delete button 1158. When clicked, the Start Saving Session button 1152 requests the 602b and/or the host 604 to save the video message session (e.g., pending and viewed video messages). A video message session may be saved locally at the recipient 602b or remotely at the host 604 (e.g., in a temporary file). The storage capacity bar 1154 indicates the percentage of storage capacity used. When the Play button 1156 is clicked, a pending video message can be played out of order or a viewed video message can be replayed. When the Delete button 1158 is clicked, a pending and/or viewed video message can be deleted.

In another implementation, the creator of a video message may decide that a pending video message has become irrelevant and instruct the host 604 to delete the video message from the queue. The host 604 would remove the pending video message from the queue and the pending video message would disappear from the video message session window 1150 displayed by the recipient 602b.

The host 604 then sends the video message to the recipient 602b (step 660). The host 604 may send the video message to the recipient 602b without user intervention from the recipient 602b and/or may hold at the video message until receipt of a request from the recipient 602b. For example, referring again to FIG. 11, the host 604 may hold the video message and send a hypertext message 1007 identifying a pending video message to the sender 602b. The hypertext message 1107 is displayed in the IM window 1105, and when clicked requests the host 604 to download the pending video message to the recipient 602b. When the video message is transferred from the 604 to the recipient 602b, the transfer indicator 1145 may change colors.

The recipient 602b receives (step 662) and displays (step 664) the video message. In one implementation, the video message is displayed in the receive video message window 1140. The video message may be displayed automatically after the hypertext message 1107 is clicked or delayed until the display toolbar 1142 is clicked. If the hypertext message 1107 is clicked again after the video message has been viewed, the video message will be retrieved and replayed. The video message may be stored by the recipient 602b as a video file (e.g. QuickTime file or AVI file). Stored video files may be replayed or transferred to other users as an e-mail attachment, for example.

In one implementation, an active video messaging session uses three communication channels: a Generic Signaling Interface (GSI) channel, a Control channel, and a Video channel. The GSI channel is used by the video session to establish the initial connection. During this connection, the local IP addresses are exchanged. After the initial connection phase is done, the GSI channel is no longer used. By using the GSI channel, the exchange of local IF addresses is only done when both users authorize such an exchange by, for example, clicking on the Connect button 918. These actions protect users from having their local LP address automatically obtained without their consent.

The Control channel is a TCP/IP socket, where the IP address and port number of the remote side are obtained through the GSI channel. The Control channel is used to send/receive control attributes of the video session while the session is active. For example, because some firewalls will not allow an external connection to a socket on the inside of the firewall, the video tool attempts a connection from both sides of the session. This action allows a connection to be made if there is a maximum of one firewall within the connection. If there is a firewall on both sides, the chances are that no connection can be made and the video session will fail. To work across two firewalls, the user must obtain the port range used by video such that one of the firewalls can be modified to pass the range through.

The Video channel is a TCP/IP socket used to transport video packets. This channel can either be UDP or TCP. In general, UDP is used since it minimizes latency. However, because some firewalls will not allow UDP packets to pass through, the video channel may have to use TCP. The video tool indicates the mode (i.e., TCP, UDP), or an auto mode where it attempts a UDP test, and upon failure resorts to TCP.

Figure 12:
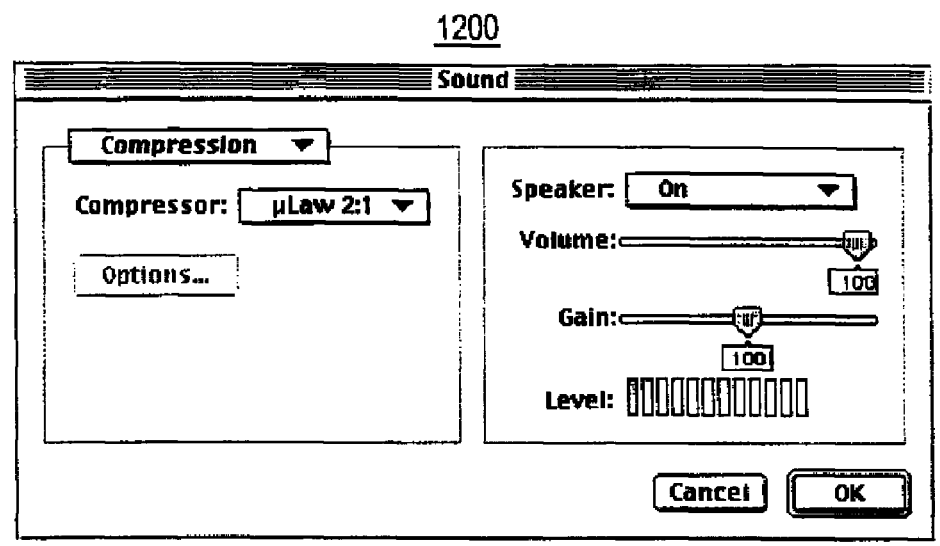
Figure 13:
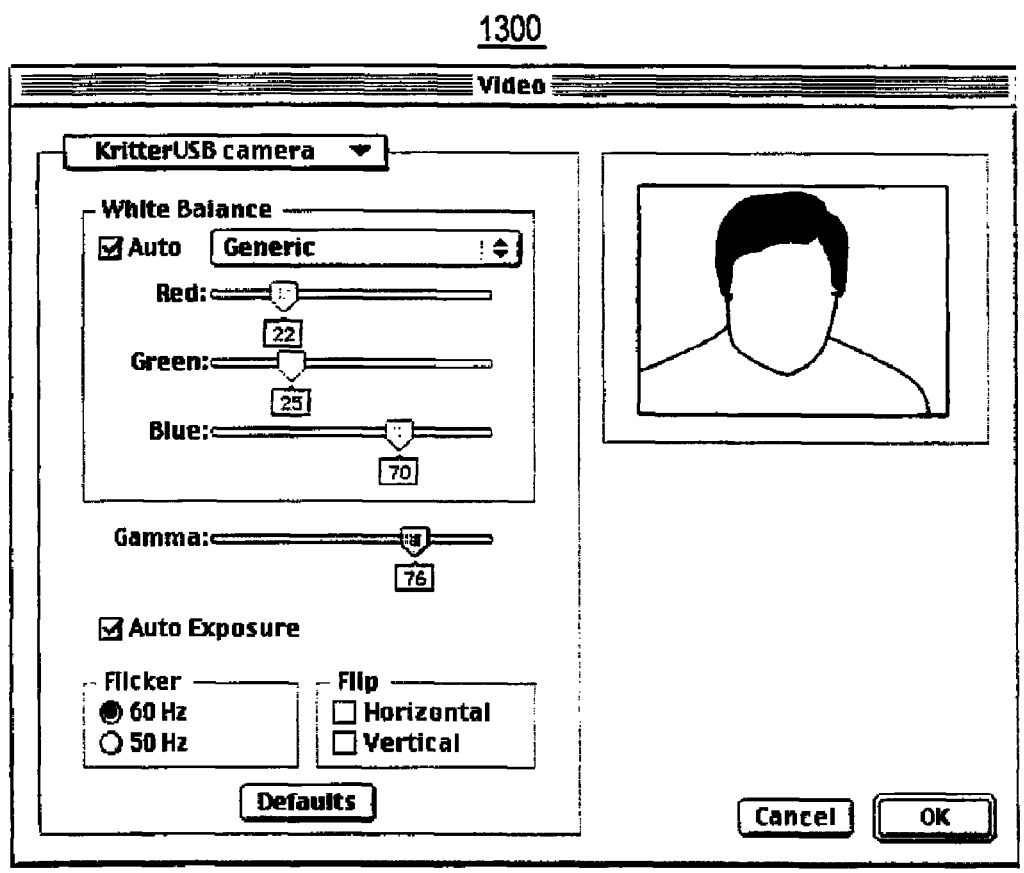

Referring to FIGS. 12 and 13, a video tool displays a UI 1200 and a UI 1300 for allowing a user to tailor video message functionality. The UI 1200 enables the user to control video message compression. The video tool also may include security features to protect the integrity of transferred data. For example, the video tool may compress data using a proprietary algorithm or may send the data in a proprietary protocol. The UI 1200 also enables the user to control the volume, gain, and level for the speaker and microphone.

The UI 1300 enables the user to control the display of the video picture. For example, the UI 1300 includes settings for white balance, gamma correction, exposure, flicker, flip, and/or other video features.

The video tool may be any type of client controller (e.g., software, application, program) loaded on to a client device. The video tool responds to user interfaces and translates user commands into the appropriate actions with the client device. For example, the video tool opens, reads, writes, and closes the physical components on the client devices needed for video. The video tool also controls video and control channels with callbacks being executed to indicate status change.

A number of implementations have been described. Nevertheless, it will be understood that various modifications may be made. In particular, a video-enabled IM client can conduct messaging sessions with any type of IM client capable of messaging. For example, if the recipient 602*b* does not have the capability to receive a video message, the sender 602*a* may store the video message as a video file and then transfer the video file to the recipient 602*b*. The video file may be transferred as an e-mail attachment or transferred directly through a socket connection as described in commonly owned U.S. patent application Ser. No. 09/572,952, which is incorporated by reference in its entirety. In this way, a subscriber without camera equipment can still communicate with video-enabled IM clients by viewing a transferred video file and then responding to the video file by sending an instant message.

Other embodiments are within the scope of the following claims.

What is claimed is:

1. A communications method, comprising:
    initiating an instant messaging session between a sender and a recipient;
    transmitting an instant message to a server;
    receiving an authentication report from the server indicating that the recipient is a valid recipient;
    receiving a report from the server that contains capability information of the recipient;
    transmitting a video messaging session initiation request to the server;
    receiving a report from the server that a video messaging session has been established between the sender and the recipient;
    generating a video message; and
    transmitting the video message to the recipient.

2. The method of claim 1, wherein the sender is associated with a first subscriber and the recipient is associated with a second subscriber.

3. The method of claim 2, wherein initiating an instant messaging session comprises:
    transmitting, to the server, an access request from the sender, the request comprising first subscriber identity information.

4. The method of claim 1, wherein the authentication report is created based on matching identity information corresponding to the sender and the recipient with identity information corresponding to valid subscribers stored in a reverse look-up table.

5. The method of claim 1, wherein the capability information comprises an indication of the capability of the recipient to receive video instant messages.

6. A computer readable storage medium, wherein the computer readable storage medium is storing instructions for:
    initiating an instant messaging session between a sender and a recipient;
    transmitting an instant message to a server;
    receiving an authentication report from the server indicating that the recipient is a valid recipient;
    receiving a report from the server that contains capability information of the recipient;
    transmitting a video messaging session initiation request to the server;
    receiving a report from the server that a video messaging session has been established between the sender and the recipient;
    generating a video message; and
    transmitting the video message to the recipient.

7. The computer readable storage medium of claim 6, wherein the sender is associated with a first subscriber and the recipient is associated with a second subscriber.

8. The computer readable storage medium of claim 7, wherein initiating an instant messaging session comprises:
    transmitting, to the server, an access request from the sender, the request comprising first subscriber identity information.

9. The computer readable storage medium of claim 6, wherein the authentication report is created based on matching identity information corresponding to the sender and the recipient with identity information corresponding to valid subscribers stored in a reverse look-up table.

10. The computer readable storage medium of claim 6, wherein the capability information comprises an indication of the capability of the recipient to receive video instant messages.

11. A communications method comprising:
    receiving, at a server, an instant message that is addressed from a sender to a recipient;
    transmitting, from the server, an authentication report indicating that the recipient is a valid recipient;
    transmitting, from the server, a report that contains capability information of the recipient;
    receiving, from at least one of the sender or the recipient, a video messaging session initiation request;
    generating, by the server, a report that a video messaging session has been established between the sender and the recipient; and
    enabling the transmission a of a video message from the sender to the recipient.

12. The method of claim 11, wherein the sender is associated with a first subscriber and the recipient is associated with a second subscriber.

13. The method of claim 12, further comprising initiating an instant messaging session between the sender and the recipient, wherein initiating the instant messaging session comprises:
    receiving, by the server, an access request from the sender, the request comprising first subscriber identity information;
    receiving, by the server, an access request from the recipient, the request comprising second subscriber identity information;
    verifying, by the server, the first subscriber identity information and the second identity information; and
    authorizing access to the server by the sender and the recipient.

14. The method of claim 11, wherein the authentication report is created by matching identity information corresponding to the sender and the recipient with identity information corresponding to valid subscribers stored in a reverse look-up table.

15. The method of claim 11, wherein the capability information comprises an indication of the capability of the recipient to receive video instant messages.

16. A computer-readable storage medium storing instructions which, when executed by a processor, cause the processor to perform a method comprising:

receiving, at a server, an instant message that is addressed from a sender to a recipient;

transmitting, from the server, an authentication report indicating that the recipient is a valid recipient;

transmitting, from the server, a report that contains capability information of the recipient;

receiving, from at least one of the sender or the recipient, a video messaging session initiation request;

generating, by the server, a report that a video messaging session has been established between the sender and the recipient; and enabling the transmission a of a video message from the sender to the recipient.

17. The computer-readable storage medium of claim 16, wherein the sender is associated with a first subscriber and the recipient is associated with a second subscriber.

18. The computer-readable storage medium of claim 17, wherein the method performed by the processor further comprises initiating an instant messaging session between the sender and the recipient, and wherein initiating the instant messaging session comprises:

receiving, by the server, an access request from the sender, the request comprising first subscriber identity information;

receiving, by the server, an access request from the recipient, the request comprising second subscriber identity information;

verifying, by the server, the first subscriber identity information and the second identity information; and authorizing access to the server by the sender and the recipient.

19. The computer-readable storage medium of claim 16, wherein the authentication report is created by matching identity information corresponding to the sender and the recipient with identity information corresponding to valid subscribers stored in a reverse look-up table.

20. The computer-readable storage medium of claim 16, wherein the capability information comprises an indication of the capability of the recipient to receive video instant messages.

* * * * *